(12) United States Patent
Walton et al.

(10) Patent No.: US 9,735,972 B2
(45) Date of Patent: Aug. 15, 2017

(54) PEER-ENABLED NETWORK ACCESS EXTENSION USING YIELD MANAGEMENT

(71) Applicant: QUALCOMM Incorporated, San Diego, CA (US)

(72) Inventors: Jay Rodney Walton, Carlisle, MA (US); Junyi Li, Chester, NJ (US); Parshanth Haridas Hande, Somerset, NJ (US); John Wallace Nasielski, San Diego, CA (US); Michaela Vanderveen, Tracy, CA (US)

(*) Notice: Subject to any disclaimer, the term of this patent is extended or adjusted under 35 U.S.C. 154(b) by 156 days.

(21) Appl. No.: 14/675,341

(22) Filed: Mar. 31, 2015

(65) Prior Publication Data

US 2016/0204951 A1  Jul. 14, 2016

Related U.S. Application Data

(60) Provisional application No. 62/102,440, filed on Jan. 12, 2015.

(51) Int. Cl.
*H04W 36/00* (2009.01)
*H04L 12/14* (2006.01)
(Continued)

(52) U.S. Cl.
CPC ........ *H04L 12/1475* (2013.01); *H04M 15/46* (2013.01); *H04M 15/51* (2013.01);
(Continued)

(58) Field of Classification Search
CPC ..... H04W 4/20; H04W 16/26; H04W 84/047; H04W 40/22; H04W 88/08; H04W 24/04; H04W 28/24
See application file for complete search history.

(56) References Cited

U.S. PATENT DOCUMENTS 6,275,695 B1  8/2001  Obhan
6,728,266 B1  4/2004  Sabry et al.
(Continued)

FOREIGN PATENT DOCUMENTS

EP           2887751 A1    6/2015
WO    WO-2014032311 A1    3/2014

OTHER PUBLICATIONS

International Search Report and Written Opinion—PCT/US2016/012080—ISA/EPO—Apr. 26, 2016.
(Continued)

*Primary Examiner* — Sai Aung
(74) *Attorney, Agent, or Firm* — Qualcomm IP Dept.; James Hunt Yancey, Jr.

(57) ABSTRACT

Aspects of the present disclosure provide for yield management models for dynamically pricing access to wireless communication services. In some examples, access to a network is intermediated by a surrogate access point, which may act as a proxy or relay, expanding communication services to client devices that otherwise may lack a subscription, or may lack a suitable communication interface, to communicate directly with the wireless network. Here, the surrogate access point may be a subscriber device or user equipment. By utilizing the yield management model, the surrogate access point may receive compensation for sharing its connection to the network with nearby client devices. Other aspects, embodiments, and features are also claimed and described.

42 Claims, 11 Drawing Sheets

(51) Int. Cl.
*H04W 4/24* (2009.01)
*H04M 15/00* (2006.01)
*H04W 48/16* (2009.01)
*H04W 88/04* (2009.01)
*H04W 88/06* (2009.01)
*H04W 88/10* (2009.01)
*H04W 84/04* (2009.01)

(52) U.S. Cl.
CPC ....... *H04M 15/81* (2013.01); *H04M 15/8351* (2013.01); *H04W 4/24* (2013.01); *H04W 48/16* (2013.01); *H04W 88/04* (2013.01); *H04W 88/06* (2013.01); *H04W 88/10* (2013.01); *H04W 84/045* (2013.01)

(56) References Cited

U.S. PATENT DOCUMENTS

| | | |
|---|---|---|
| 8,848,579 B1 | 9/2014 | Reeves et al. |
| 2006/0007955 A1 | 1/2006 | Kotzin |
| 2007/0167174 A1 | 7/2007 | Halcrow et al. |
| 2009/0196174 A1* | 8/2009 | Ji .......................... H04L 1/0025 370/230.1 |
| 2009/0238118 A1* | 9/2009 | Steinheider ........... H04W 92/12 370/328 |
| 2010/0008235 A1* | 1/2010 | Tinnakornsrisuphap ........................ H04L 29/12264 370/241 |
| 2010/0135266 A1 | 6/2010 | Karaoguz et al. |
| 2010/0202343 A1* | 8/2010 | Hunzinger ............. H04B 7/155 370/315 |
| 2012/0263119 A1 | 10/2012 | Monogioudis |
| 2013/0336199 A1* | 12/2013 | Schwartz ........... H04B 7/15507 370/315 |
| 2014/0171062 A1 | 6/2014 | Fallgren et al. |
| 2014/0219104 A1 | 8/2014 | Senarath et al. |
| 2014/0349613 A1 | 11/2014 | Rider et al. |
| 2015/0056960 A1* | 2/2015 | Egner ................... H04W 12/08 455/411 |
| 2015/0131618 A1* | 5/2015 | Chen ..................... H04W 16/02 370/332 |
| 2015/0270877 A1* | 9/2015 | Hessler ................ H04W 48/20 370/329 |
| 2016/0183242 A1* | 6/2016 | Cordeiro ........... H04W 36/0072 370/331 |

OTHER PUBLICATIONS

Second Written Opinion from International Application No. PCT/US2016/012080, dated Dec. 12, 2016, 16 pp.

* cited by examiner

Exemplary Discovery Frame - 3GPP LTE ProSe/D2D

Exemplary Discovery Frame –
WiFi Alliance NAN

Exemplary Discovery Frame –
BlueTooth Low-Energy (BTLE)

PEER-ENABLED NETWORK ACCESS EXTENSION USING YIELD MANAGEMENT

PRIORITY CLAIM

This application claims priority to and the benefit of provisional patent application No. 62/102,440, titled "Peer-enabled Network Access Extension Using Yield Management" and filed in the United States Patent and Trademark Office on Jan. 12, 2015, the entire content of which is incorporated herein by reference.

TECHNICAL FIELD

Aspects of the present disclosure relate generally to wireless communication systems, and more particularly, to the extension of access to wireless communication systems using peers on the network and yield management techniques.

INTRODUCTION

Wireless communication networks are widely deployed to provide various communication services such as telephony, video, data, messaging, broadcasts, and so on. Existing wireless networks are enabled through operators that manage access to licensed portions of the spectrum, and through other entities that employ technologies that utilize unlicensed portions of the spectrum. Many wireless-enabled devices, such as smart phones, typically have hardware that enables communication on both the licensed bands (e.g., through wireless wide area network or WWAN technology such as cellular networks) and the unlicensed bands (e.g., through wireless local area network or WLAN technology such as WiFi, and/or wireless personal area networks or WPAN technology such as Bluetooth). Thus, it is frequently the case that a user has a choice to use one or more of multiple available access technologies for any communication activity desired at that time.

As the availability of both WWAN and WLAN technologies continues to increase, users find this choice between services to be available more and more frequently. Therefore, a user's purchase of both means of access may become viewed as redundant, potentially allowing inefficient use of power resources, and subscriptions to one service or the other may begin to suffer. Therefore, operators of WWAN systems that utilize licensed spectrum may continue to seek a competitive advantage to ensure their subscribers continue to seek access over the licensed spectrum. This can aid in promoting consistent user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for dynamic subscriptions and smart data pricing of wireless communication services utilizing yield management or revenue management models. In some examples, new channels for access to a wireless network may be provided and intermediated by a surrogate access point, which may act as a proxy or relay, expanding communication services to client devices that may otherwise lack a subscription or may lack a suitable communication interface to communicate directly with the wireless network. Here, the surrogate access point may be a subscriber device or user equipment that communicates with the client device, and with the wireless network. By utilizing the yield management model, the surrogate access point may receive compensation for sharing its connection to the network with nearby client devices.

In one aspect, the disclosure provides a wireless communication device that includes an access interface transceiver configured for communication with one or more proximate devices, a backhaul interface transceiver configured for communication with a first network, and a processor. Here, the processor is configured to receive one or more wireless communication signals utilizing the access interface transceiver or the backhaul interface transceiver. These communication signals include one or more data packets having information indicative of one or more yield management configurations. The processor is further configured to determine to place the wireless communication device in an operating state where it is the device shares access to the first network over the backhaul interface with the one or more proximate devices by communicating with those one or more proximate devices over the access interface and acts as a surrogate access point to the first network.

In another aspect, the disclosure provides a wireless communication device that includes an access interface transceiver configured for communication with a surrogate access point, and a processor. Here, the processor is configured to receive one or more wireless communication signals utilizing the access interface transceiver. These communication signals include one or more data packets having information indicative of one or more yield management configurations. The processor is further configured to determine to place the wireless communication device in an operating state where it is configured to access a first network by communicating with the surrogate access point utilizing the access interface transceiver, the surrogate access point acting as an access point for the first network.

In still another aspect, the disclosure provides a network node that includes a backhaul interface transceiver configured for communication with one or more proximate surrogate access points, and a processor. Here, the processor is configured to receive one or more wireless communication signals utilizing the backhaul interface transceiver. These communication signals include one or more data packets having information indicative of one or more yield management configurations. The processor is further configured to determine to place the network node in an operating state where it is configured to provide access to a network to one or more wireless communication devices, by communicating with the surrogate access points, the one or more surrogate access points acting as access points for the network.

In yet another aspect, the disclosure provides a method of wireless communication operable at a wireless communication device. Here, the method includes receiving one or more wireless communication signals over an access link or a backhaul link, the communication signals including one or more data packets having information indicative of one or more yield management configurations, and entering an operating state for sharing access to a first network over the backhaul link with one or more proximate devices by communicating with those one or more proximate devices over the access link and acting as a surrogate access point to the first network.

In yet another aspect, the disclosure provides a method of wireless communication operable at a wireless communication device. Here, the method includes receiving one or more wireless communication signals from a surrogate access point over an access link, the communication signals including one or more data packets having information indicative of one or more yield management configurations, and entering an operating state where the wireless communication device is configured to access a first network by communicating with the surrogate access point utilizing the access link, the surrogate access point acting as an access point for the first network.

In still another aspect, the disclosure provides a method of wireless communication. Here, the method includes receiving one or more wireless communication signals from one or more surrogate access points over a backhaul link, the communication signals including one or more data packets having information indicative of one or more yield management configurations, and entering an operating state for providing access to a network to one or more wireless communication devices, by communicating with the one or more surrogate access points over the backhaul link, the one or more surrogate access points acting as access points for the network.

In still another aspect, the disclosure provides a wireless communication device that includes means for receiving one or more wireless communication signals over an access link or a backhaul link, the communication signals including one or more data packets having information indicative of one or more yield management configurations, and means for entering an operating state for sharing access to a first network over the backhaul link with one or more proximate devices by communicating with those one or more proximate devices over the access link and acting as a surrogate access point to the first network.

In yet another aspect, the disclosure provides a wireless communication device that includes means for receiving one or more wireless communication signals from a surrogate access point over an access link, the communication signals including one or more data packets having information indicative of one or more yield management configurations, and means for entering an operating state where the wireless communication device is configured to access a first network by communicating with the surrogate access point utilizing the access link, the surrogate access point acting as an access point for the first network.

In yet another aspect, the disclosure provides a wireless communication device that includes means for receiving one or more wireless communication signals from one or more surrogate access points over a backhaul link, the communication signals including one or more data packets having information indicative of one or more yield management configurations, and means for entering an operating state for providing access to a network to one or more wireless communication devices, by communicating with the one or more surrogate access points over the backhaul link, the one or more surrogate access points acting as access points for the network.

In still another aspect, the disclosure provides a computer-readable medium storing computer executable code, having instructions for causing a wireless communication device to receive one or more wireless communication signals over an access link or a backhaul link, the communication signals including one or more data packets having information indicative of one or more yield management configurations, and instructions for causing the wireless communication device to enter an operating state for sharing access to a first network over the backhaul link with one or more proximate devices by communicating with those one or more proximate devices over the access link and acting as a surrogate access point to the first network.

In still another aspect, the disclosure provides a computer-readable medium storing computer executable code, having instructions for causing a wireless communication device to receive one or more wireless communication signals from a surrogate access point over an access link, the communication signals including one or more data packets having information indicative of one or more yield management configurations, and instructions for causing the wireless communication device to enter an operating state where the wireless communication device is configured to access a first network by communicating with the surrogate access point utilizing the access link, the surrogate access point acting as an access point for the first network.

In yet another aspect, the disclosure provides a computer-readable medium storing computer executable code, having instructions for causing a wireless communication device to receive one or more wireless communication signals from one or more surrogate access points over a backhaul link, the communication signals including one or more data packets having information indicative of one or more yield management configurations, and instructions for causing the wireless communication device to enter an operating state for providing access to a network to one or more wireless communication devices, by communicating with the one or more surrogate access points over the backhaul link, the one or more surrogate access points acting as access points for the network.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
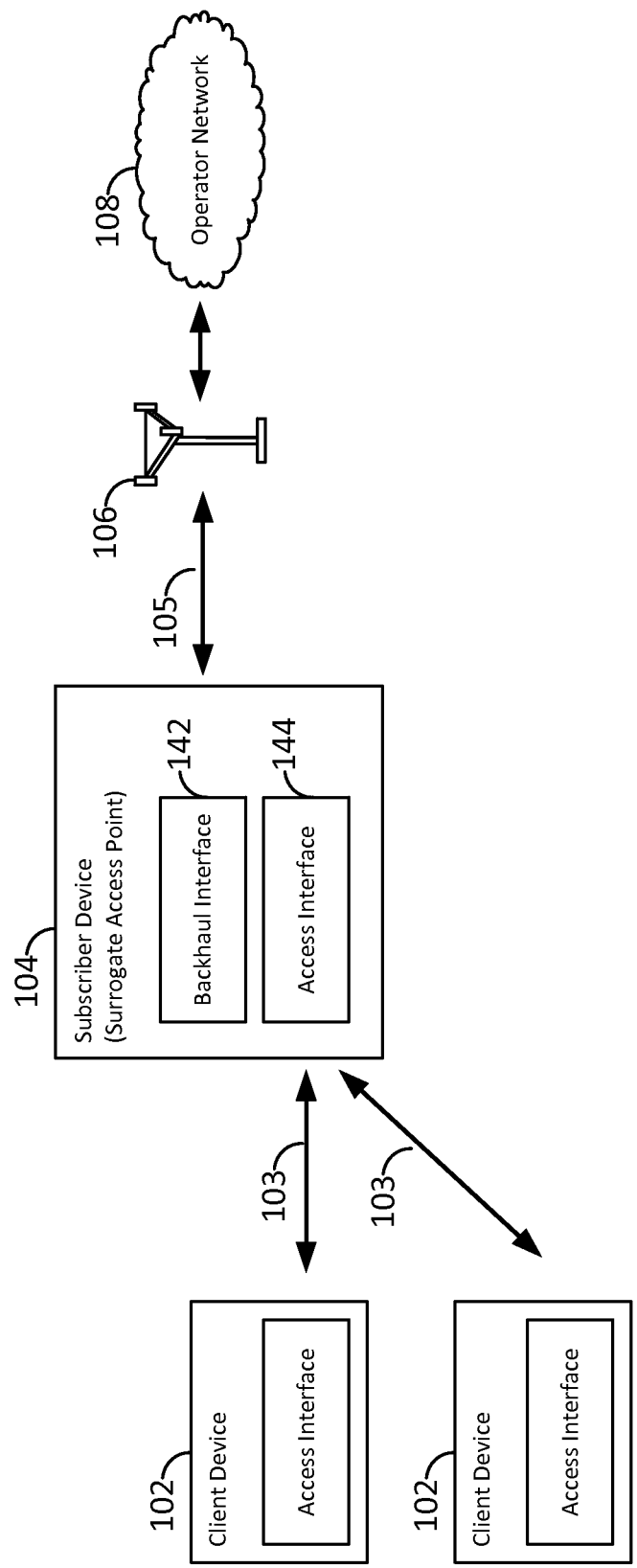
FIG. 1 is a block diagram illustrating an example of a subscriber device acting as a surrogate access point according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various concepts presented throughout this disclosure may be implemented across a broad variety of telecommunication systems, network architectures, and communication standards. As used in the present disclosure, the term 'operator network' refers generally to a network maintained by an operator that provides wired and/or wireless voice and/or data communication subscription services. When wireless, the subscription service may utilize any suitable licensed or unlicensed portion of the spectrum. That is, governmental entities regulate the use of the wireless spectrum in their territories, and generally some portions of the spectrum require an operator to purchase a license from the government to utilize those bands for wireless communication; while other bands are unlicensed, or generally free to use (with certain limitations) by anyone without purchasing such a license.

The cost and availability of wireless access through operators that offer services in licensed bands differ from those offered in unlicensed bands. With those that use the licensed bands, access is generally priced according to a service plan that may include various complexities such as tiered pricing, shared/family plans, texting, voice, and roaming. Accordingly, the ultimate cost to the subscriber is unknown. The operators themselves generally pay to build a network, pay for the deployment of the backhaul, pay for fiber, and pay for the radio equipment. If the network is not being used at its full capacity all the time, then there is some fraction of the capacity that is going unutilized. There is only one opportunity to monetize a particular time-frequency resource at a particular location, and if it is not utilized, then the opportunity is lost forever.

In recent years, wireless communication services utilizing unlicensed spectrum such as WiFi have become more and more ubiquitous, providing communication services in locations that were previously only available by way of licensed-band networks (e.g., cellular networks). For example, wireless hot spots are available at coffee shops, transportation hubs, and in many cases, in city-wide deployments. Further, some home subscribers' cable boxes are being configured by the operator to offer open WiFi access to any of their network's subscribers in the vicinity, or even to non-subscribers. For this reason, the large majority of wireless devices in use today for accessing subscription services on licensed operator networks (e.g., cellular networks) also include means to communicate on unlicensed bands (e.g., a WiFi transceiver). Their users often prefer to utilize the unlicensed bands, since it may not affect their potentially limited voice and/or data subscription. Savvy travelers are well-trained to turn off data roaming and look for WiFi while on the road. Moreover, a reference towards WiFi may also be expressed directly by applications or within the high level operating system. For example, Android and IOS use WiFi by default when available. This may cause problems because the cost of WiFi access is not considered.

Current operator networks are generally operated as walled gardens, where they are not open for access by anyone not having a subscription with the operator. Wireless devices generally utilize a subscriber identity module (SIM) tied to a single cellular operator, and frequently only have a single SIM slot and/or are technologically locked to one operator. Thus, an operator generally may not poach or take away customers from another operator. However, as operators of networks that utilize unlicensed spectrum continue to grow and offer the same or similar services, this business model may fall away. Even today, a large majority of all data traffic over all wireless networks generated by smart phones goes over WiFi (i.e., unlicensed band) networks.

Operators maintaining operator networks utilizing licensed spectrum may accordingly view this expansion of unlicensed network access as a problem, representing increased competition. As users move more and more of their voice and data communication onto unlicensed networks, their use of their subscription to the licensed operator network potentially decreases. Competition from such unlicensed communication services can appear to be a formidable problem. This is because unlicensed networks are supported by free unlicensed spectrum. Operators, however, have a different cost structure, such as advertising-based subsidies on service, and in many examples, service/infrastructure that is subsidized by subscription fees paid by home or business Internet service subscribers.

Various aspects of the present disclosure enable and provide systems, methods, and devices for network operators to leverage unlicensed spectrum. For example, operator networks providing wireless subscription services in licensed bands can take advantage of the unlicensed band communication capabilities of their subscribers' devices, helping to improve their revenues. That is, rather than competing directly against the unlicensed-band communication of their users, operators can use these capabilities to draw traffic to the resources provided by their network in the licensed spectrum utilizing yield management techniques.

Yield management, or revenue management, as utilized within the present disclosure generally refers to dynamic and variable pricing of perishable or consumable (non-durable) goods or services based on the existing supply and demand for those goods or services. Here, a good or service is perishable when it loses value over time, or becomes unavailable after a given amount of time. An aim is to increase (e.g., maximize) revenue at all times. Yield management has been implemented in several industries, including airlines and automobile transportation services.

For example, an airline has a certain number of flights between destinations scheduled on a given day. The airline accordingly has a given number of seats on each of those flights to offer for sale. Each time a flight occurs with an empty seat, this unused seat represents a loss of potential revenue for the airline, for which there is no possibility of recovery. That is, each seat on a given flight can be considered a perishable good. It is to the airline's advantage to sell all seats on every flight. Accordingly, airlines frequently implement yield management models, where seats are offered for low prices far in advance of the flight, and as the flight approaches and as the seats start to fill up, the prices increase. In this way, the occupancy of the seats on each flight can be increased or maximized, allowing the airline to monetize most if not all available seats in each flight. As described in further detail below, similar techniques may be applied to wireless communication services.

As another example, Uber is an automotive transportation services company that manages the pricing of taxi services offered by its drivers to the public. Similar to the model used by airlines, at times when the demand for transportation services is high, the price for a ride with Uber generally is increased. However, unlike the model offered by airlines, it is quite simple for Uber additionally to control the supply of transportation services available. That is, in periods of high demand, additional drivers can relatively quickly be sent out to meet the demand. In the context of wireless communication services, the supply (i.e., the capacity of the network) at a particular time and location can be variable to some extent, e.g., by deploying low-power cells when and where they are needed, and modifying the network functionality. However, these variations are practically limited by the technology, the deployment, and constraints imposed by the network infrastructure used. As described in further detail below, it is possible to exploit existing hardware capabilities of wireless devices to dynamically alter the supply of wireless resources to a wider set of users. That is, another set of resources does exist and has already been deployed. Specifically, users' devices may be utilized as surrogate access points to provide access to the wireless communication network.

In various aspects of the present disclosure, a surrogate access point (SAP) may be a communication device that behaves as a proxy or relay between a client device and a wireless communication network, providing dynamic subscriptions to client devices under yield management principles to enable network operators to monetize available communication resources.

FIG. 1 is a block diagram illustrating one example of a network that includes a surrogate access point in accordance with some aspects of the present disclosure. In the illustrated example, a subscriber device 104 includes a backhaul interface 142 and an access interface 144. Here, the subscriber device 104 may utilize the backhaul interface 142 for communication with an operator network 108 by way of a base station or other suitable network node 106. The communication between the subscriber device 104 and the base station 106 (i.e., a backhaul link 105) may be any suitable wired or wireless link, and in some examples may correspond to a wireless wide area network (WWAN) link as commonly utilized by cellular subscribers. That is, within the present disclosure, a backhaul interface and a backhaul link generally refer to a wired or wireless link between a subscriber device and network node such as a base station.

Further, the subscriber device may utilize the access interface 144 for communication with one or more client devices 102. The communication between the subscriber device 104 and the client device 102 (i.e., the access link 103) may be any suitable wired or wireless link, and in some examples may correspond to a wireless local area network (WLAN) link such as WiFi or Bluetooth.

The inclusion of a separate backhaul interface 142 and access interface 144 is merely one example. In another example within the scope of the present disclosure, a subscriber device 104 may utilize a single transceiver or communication interface that performs the function of both the backhaul interface and the access interface. That is, the subscriber device may be enabled to communicate with both the operator network 108 and the client device 102 utilizing one or more suitable transceivers or communication interfaces.

In the illustration, client devices 102 are illustrated to include an access interface, which may be the same as or similar to the access interface 144 in the subscriber device 104. Of course, client devices 102 may include one or more other communication interfaces, such as a backhaul interface the same as or similar to the backhaul interface 142 in the subscriber device 104.

By utilizing yield management techniques, wireless operator networks 108, which sell access over a backhaul link 105 such as that between the backhaul interface 142 of the subscriber device and the base station 106, can advertise current access prices for access to this backhaul link 105 based on a variety of parameters or conditions. This can enable consumers to manage their access costs according to a set (e.g., a predefined set) of objectives. That is, operator networks 108 that utilize licensed portions of the spectrum offer a perishable good. Here, however, the perishable good for sale can be thought of as a resource block that is available for communication usage at a given time, at one or more points in space. Within the present document, such a resource block, which may be a time-frequency resource, may generally and equivalently be referred to as a resource or a wireless resource. As one nonlimiting example, an operator network 108 may wish to increase or maximize utilization of available wireless resources on the backhaul link 105, and accordingly to increase or maximize revenues, by offering an incentivized pricing model. In this way, the operator can encourage subscribers to utilize their network during off-peak hours. Conversely, the operator may wish to ensure that the quality of service (QoS) of the service they provide meets their customers' needs, and may accordingly elect to price access higher during periods of peak loading. In this way, subscribers may be discouraged from utilizing the network during periods of peak loading.

In addition, from a subscriber's perspective, it may be desirable to be able to manage access costs so that a desired QoS can be achieved at the lowest possible price. Subscribers may in some circumstances find that direct access to their own primary service provider's network is compromised from a bandwidth perspective. In such a case, it would be advantageous to discover alternative means of access to the operator network 108, which may be available to satisfy their needs. In other cases, even without necessarily having their primary means of access be compromised in any way, if other means of access are available at lower costs than their direct connection, the subscriber may find it advantageous to use those alternative means of access.

Thus, according to some aspects of the present disclosure, an operator network 108 may be enabled to leverage its subscribers' devices 104 to act as surrogate access points.

This can extend operator service offerings to other users' devices (e.g., client devices 102) in the vicinity of their subscribers' devices 104. Within the present document, a device is broadly defined as a user equipment (UE), an internet-of-everything (IoE) device, a smart meter, a machine-type communication (MTC) device, a vehicle, a smart driverless car, an entertainment device, a wearable wireless device, or any other wireless communication device capable of communicating with an operator network via one or more wireless communication interfaces. In some examples, a device such as the subscriber device 104 may be capable of acting as a surrogate access point, capable of communicating with an operator network 108 utilizing a backhaul interface 142, and also capable of communicating with a client device 102 utilizing an access interface 144. In some ways, a surrogate access point is similar to a relay, known to those skilled in the art.

In some examples, a device may be a client device 102, communicating directly with the operator network 108 utilizing its own backhaul interface (e.g., a cellular radio), and/or communicating with the operator network 108 by way of a surrogate access point, utilizing an access interface between the client device 102 and the surrogate access point. The surrogate access point may subscribe to one operator network 108, in which case it only aggregates traffic from client devices 102 relevant to that operator; alternatively, the surrogate access point may itself have service agreements with multiple operator networks, and may accordingly aggregate traffic from client devices relevant to two or more operators.

Surrogate access point functionality may in some aspects be similar to the tethering or WiFi hotspot functionality already enabled in many existing subscriber devices. For example, when a first user with a subscription to a first operator network enables such a hotspot functionality, other nearby UEs can be enabled to access the first operator network via the first user's WiFi connection (i.e., the access interface). Here, the second user may not otherwise have access to the first operator's network, for example, because the second user subscribes to a different operator, which may be over capacity, out of service, or too expensive, or the second user may be roaming in a foreign country, etc.

Currently, if a subscriber device 104 were to use an access interface 144 (e.g., a WiFi interface) to share its backhaul connection to the operator network to which it is subscribed (e.g., conventional tethering or hotspot usage), the subscriber device 104 is billed for the access. For example, the data used by connected devices when a subscriber device 104 is acting as a WiFi hotspot is billed to the owner of the subscriber device 104. Client devices 102 connecting through the subscriber device's WiFi connection essentially obtain free service. This pricing model, however, is not necessary to be the case.

According to one or more aspects of the present disclosure, an operator may provide to a client device 102 seeking access to the operator network 108, information regarding the price of access to the network. Further, operators may leverage their existing subscriber base (i.e., subscriber devices 104 that have existing subscriptions to the operator network 108 utilizing the backhaul link 105) as surrogate access points to extend their service offerings to other devices. The subscriber devices 104 can in some examples participate by subsidizing the cost of access, by charging proximate client devices 102 seeking access. Power savings may also be recognized in some scenarios by some users.

The discussion below is structured into several portions. First, it begins by describing yield management, or a demand-driven model for controlling the price and supply of wireless communication services, and its business aspects including negotiation and agreement between the various entities involved. Next, the discovery of proximate devices participating in the model, connectivity between the respective devices, and mobility of client devices and/or surrogate access points is discussed. Security of the connections and authentication of the users follows, and finally, upper layer protocols utilized at the respective devices are discussed.

According to various aspects/embodiments of the present disclosure, by utilizing yield management or revenue management principles, an operator network may dynamically apply variable pricing of wireless communication services based on one or more factors or parameters. For example, the operator network may dynamically determine the price to offer for access to a set of wireless resources based on the availability or loading of those resources. As a simple example, the price can be reduced (or even zeroed) if the instantaneous utilization is below a low threshold, and the price can be increased if the instantaneous utilization is above a high threshold.

Furthermore, in some examples, the operator network may be enabled to dynamically modify the availability (supply) of network capacity to larger sets of potential client devices based on the loading of those resources at a given time. For example, referring once again to FIG. 1, in times of low congestion or high unused capacity the operator network 108 may utilize subscriber devices 104 as surrogate access points to offer their connections to the operator network 108 to any client devices 102 that are proximate to the surrogate access points 104.

From the point of view of a client device 102, a price to pay for access to the operator network 108 may be negotiated in a dynamic fashion, without necessarily having a pre-agreed subscription with that operator network 108. The negotiation process may take place between the client device 102 and the operator network 108 (utilizing a direct communication interface between the client device 102 and the operator network 108), or in another example, the negotiation process may take place between the client device 102 and a surrogate access point 104 acting on its own accord, or on behalf of the operator network 108 (utilizing an access link 103 between the client device 102 and the surrogate access point 104). To determine whether to access the operator network 108, the client device 102 may consider one or more factors, including but not limited to the price of access, the coverage available in the operator network 108, and the quality of service (QoS) available on the backhaul link 105 at that time and place.

The client device 102 may negotiate with a number of other devices in varying arrangements. For example, the client device 102 can negotiate with the operator network 108 either utilizing a direct connection to the operator network (e.g., a WWAN or other suitable backhaul link 105), or utilizing an indirect connection (e.g., an access link 103 between the client device 102 and a surrogate access point 104, such as a WLAN link). Alternatively, the client device 102 may negotiate with a proximate surrogate access point 104 utilizing the access link 103. In such an example, the surrogate access point 104 may negotiate on its own behalf, or with the authority of the operator network 108.

From the point of view of a subscriber device 104, the subscriber device 104 may in some cases act as a surrogate access point for the operator network 108. The subscriber device/surrogate access point 104 may accordingly share access to the operator network 108 over a suitable backhaul link 105 with proximate client devices 102 by communicating with those devices over an access link 103. Thus, the surrogate access point 104 may act as a market maker, enabling connection between client devices 102 that have access to the surrogate access point's access interface 144, with an operator network 108 that has access to the surrogate access point's backhaul interface 142. Further, the surrogate access point 104 may aggregate downlink and/or uplink traffic for a plurality of client devices 102, combining data flows for a plurality of client devices 102 onto a single backhaul link 105.

In some examples, the operator network 108 may trigger the surrogate access point 104 to offer surrogate access to devices (e.g., client devices 102) that are proximate to the surrogate access point 104. For example, the operator network 108 may send information to the subscriber device 104 over the backhaul link 105, requesting the subscriber device 104 to offer access to any devices proximate to it. This information may include the price to offer to client devices 102, a suitable incentive or credit to offer to the subscriber device 104 to incentivize the subscriber device 104 to act as a surrogate access point, information about the backhaul link 105 connection quality, information about the access link 103 connection quality if available, duration, frequency band, or any other suitable information that the subscriber device 104 might find useful to negotiate with its proximate client devices 102. Here, the subscriber device 104 may have an opportunity to refuse to offer access to proximate devices based on a determination that the incentive provided from the operator network 108 to the subscriber device 104 is insufficient for the subscriber device 104 to offer other devices access to its subscribed backhaul link 105 resources. The subscriber device 104 may also refuse to offer access based on low battery power and/or unavailability of line power, too low quality (e.g., QoS) of the backhaul (WWAN) connection and/or the access (WLAN/WPAN) connection, or any other suitable reason.

In another example, the subscriber device 104 may voluntarily, independently, or autonomously trigger the offering of surrogate access to proximate devices.

In any case, whether working on its own or by the request of the operator network 108, the surrogate access point 104 may advertise the availability of access to the operator network 108 by way of its access interface 144 to proximate devices. The advertisement message from the surrogate access point 104, described in further detail below, may provide suitable information to the proximate devices to enable a negotiation between the potential client device 102 and the surrogate access point 104 regarding price and terms of access. Accordingly, the subscriber device 104 may enable negotiation by the client device 102 to obtain access to the operator network 108 by way of the surrogate access point 104.

Once access is obtained, the subscriber device 104, acting as a surrogate access point, may meter the backhaul link 105 usage by the client device 102. The subscriber device 104 may in some examples act as an arbiter, e.g., negotiating further purchases of access if the client device exceeds or approaches the limit of access already agreed, or cutting off access if the metered usage meets or exceeds the limit of access already agreed.

In accordance with various aspects of the present disclosure, one or more different agreements or contracts may exist in relation to the provision of access to the operator network 108 utilizing the above-described yield management techniques. For example, the client device 102 may establish an agreement with the operator, carrier, or network. Additionally, the subscriber device 104 (acting as a surrogate access point) may establish an agreement with the operator, carrier, or network. Finally, an agreement may be established between the client device 102 and the subscriber device 104 acting as the surrogate access point.

The client device 102 that seeks access to an operator network 108 may enter into an agreement with the operator, carrier, or network. In some examples, this agreement may include a provision for the client device 102 to access the operator network 108 by utilizing a surrogate access point 104 that is configured to access the operator network 108 utilizing a suitable backhaul link 105. The client device 102 may generally wish to obtain the lowest price it can obtain that satisfies one or more price parameters. The client device's price parameters may include such factors as the bandwidth available to the client device 102, the duration of the connection, various characteristics of the data communicated, latency of the connection, or any other suitable factors. On the other hand, the operator network 108 may generally wish to obtain the highest price it can obtain that satisfies one or more price parameters. The operator network's price parameters may include factors relating to the cost of providing access, such as the backhaul cost between an available surrogate access point 104 and a base station 106; the interference cost of using the access spectrum between the surrogate access point 104 and the client device 102; or any other suitable factors.

Additionally, a subscriber device 104 that acts as a surrogate access point may enter into an agreement with the operator, carrier, or network. In some examples, the agreement may include provisions for the subscriber device 104 to provide access to the operator network 108 utilizing a backhaul link 105 between the subscriber device 104 and the operator network 108, for use by one or more client devices 102 by way of an access link 103. The subscriber device 104 may or may not have an existing subscription for its own service with the operator network 108. Further, the subscriber device 104 may or may not have an existing subscription with the operator network 108 to act as a surrogate access point.

In various examples, the operator network 108 may initiate negotiation with the subscriber device 102, or the subscriber device 102 may initiate negotiation with the operator network 108.

Compensation for the owner of the surrogate access point 104, if it is made, may take many suitable forms. For example, the client device 102 may make a direct payment to the subscriber device 104 acting as the surrogate access point, utilizing any suitable payment means, such as a credit card, electronic funds transfer, cash payment (which may be acknowledged by a user of the subscriber device 104), etc. In another example, a portion of the payment from the client device 102 to the operator network 108 may be reserved for the surrogate access point 104. This portion may in some examples be paid from the operator network 108 to the owner of the subscriber device 104. In another example, the operator network 108 may provide a subsidy or discount on the subscriber's subscription payments in return for the subscriber device 104 granting access to one or more client devices 102 as a surrogate access point. In still another example, additional data and/or resource allocation may be provided for the subscriber device 104 to offset any backhaul link resources utilized by one or more client devices 102 when the subscriber device 104 acts as a surrogate access point.

In some examples, the operator network 108 may grant permission for the subscriber device 104 to act on the operator's behalf, to extend coverage and/or service to devices proximate to the subscriber device 104 as a surrogate access point. In other examples, the subscriber device 104 may be essentially transparent, facilitating negotiation between the operator network 108 and the client device 102 for the agreement to access the operator network 108 through the surrogate access point 104. This negotiation may take place using the surrogate access point 104, but the surrogate access point 104 would basically be passive, acting to exchange the negotiation between the respective entities.

Additionally, a device that wishes to access an operator network 108 as a client device 102 through a surrogate access point 104 may enter into an agreement with the subscriber device 104 that acts as the surrogate access point. The agreement may include terms for compensation to be provided from the client device 102 to the surrogate access point 104. This compensation may in some examples be blind or unknown to the client device 102, for example where the surrogate access point 104 has arrangements for compensation already agreed with the operator network 108.

In some examples, the subscriber device 104 may have permission from the operator network 108 to independently or autonomously determine to offer access and negotiate terms with proximate client devices. For example, the subscriber device 104 may act as an independent agent. Here, the surrogate access point 104 may negotiate directly with the client device 102 regarding one or more aspects of the arrangement, such as price, bandwidth, data speed, duration of access, etc.

In other examples, the subscriber device 104 may act as a permissionless surrogate access point. Here, a permissionless surrogate access point may independently offer access to its already-paid-for or subscribed resources on the backhaul link 105 to proximate devices without the operator network 108 granting such permission or even having knowledge that the subscriber device 104 is offering such surrogate access.

The price that a client device 102 ultimately pays for access to the operator network 108 (whether or not utilizing a surrogate access point 104) may be determined either by the operator network 108 or by the surrogate access point 104. When dictated by the operator network 108, the price may be provided from the operator network 108 to the surrogate access point 104, and the surrogate access point 104 may accordingly advertise to proximate devices information about the price and available resources. In addition or in the alternative, this price and resource information may be provided directly from one or more operator network base stations 106, e.g., utilizing a broadcast channel.

When the resources ultimately used by a client device 102 are less than the paid-for and/or agreed services, partial or full refunds may be available to the client device 102. Such refunds may occur when the client device 102 ends service prematurely, when one or more aspects of the connection are not as agreed (e.g., QoS is too low), when the surrogate access point 104 leaves the vicinity of the client device, or for any other suitable reason.

According to further aspects of the present disclosure, access for devices to an operator network may be negotiated by a broker. A broker is generally a device, a surrogate access point, or any other suitable communication unit capable of communicating with two or more different operator networks, and acting as a broker, offering access to the various available networks to proximate client devices. Broadly, a broker device collects supply and demand information relating to wireless access, and connects together the nodes desiring service and the nodes providing access capacity.

A broker may in some examples be any suitable subscriber device or user equipment. In some examples, the broker may be a dedicated broker, e.g., a fixed unit offering aggregator service in a high-traffic location. In other examples, the broker may be any multi-SIM user equipment or device capable of communicating with operator networks and client devices. In some examples, the broker may be a remote (e.g., cloud-based) device far away from where the wireless access takes place.

The broker may have a relationship with multiple devices, which can act as surrogate access points, and with multiple client devices that desire access services. In some examples, the broker may proactively collect information from the surrogate access points regarding the access services they are willing to provide, such as location, wireless channel capacity, reliability, QoS, etc. In other examples, the broker may be reactive, and may collect such information upon the reception of service demands from client devices.

Figure 2:
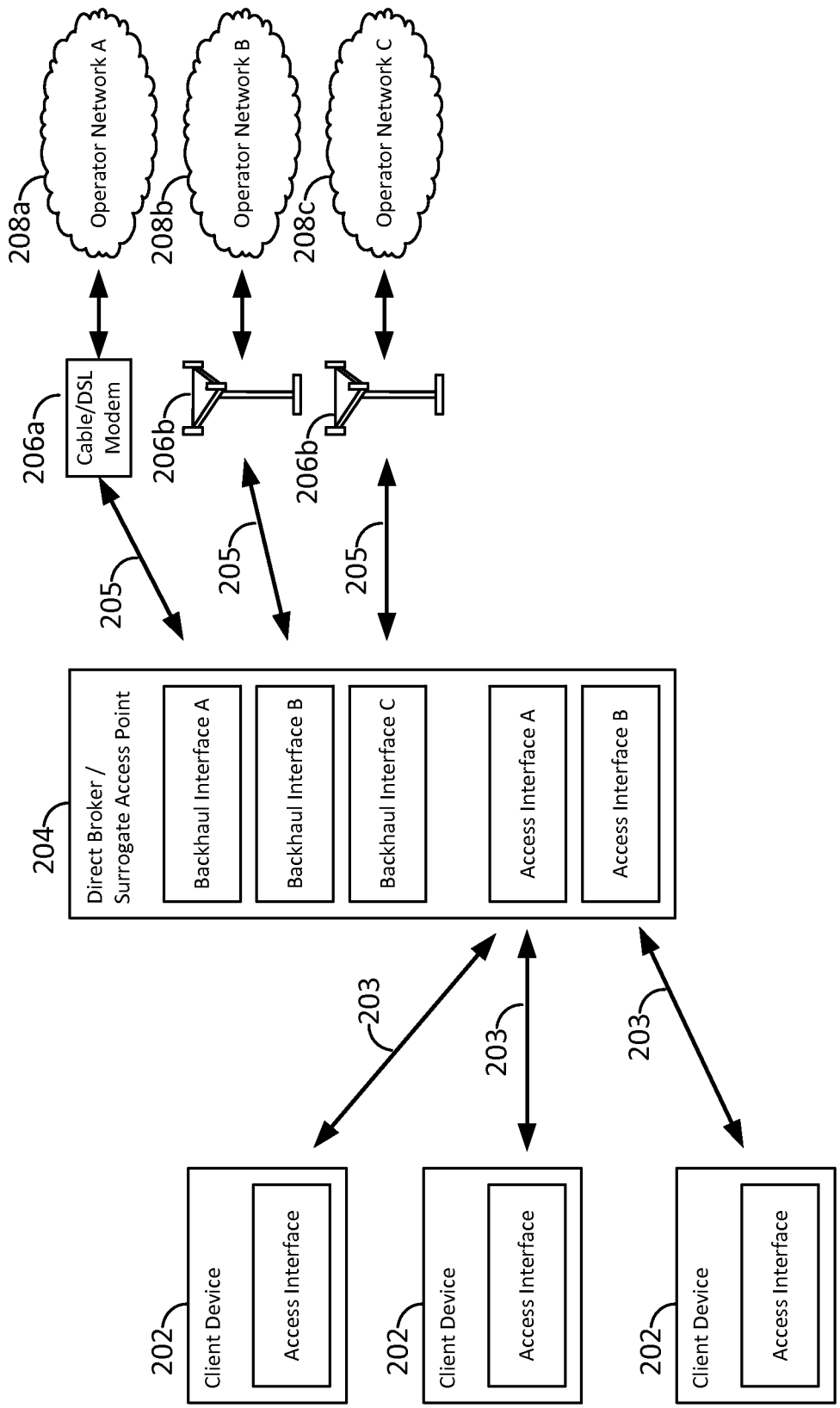
FIG. 2 is a block diagram illustrating an example of a direct broker extending network coverage to a plurality of operator networks according to some embodiments.

A broker may be a direct or indirect broker. FIG. 2 is a block diagram illustrating a communication network utilizing a direct broker 204 to connect one or more client devices 202 to an operator network 208. Here, a direct broker 204 is a surrogate access point that offers to client devices 202 access to two or more operator networks 208 if the surrogate access point 204 has backhaul links 205 available with those networks (e.g., a multi-SIM UE).

Figure 3:
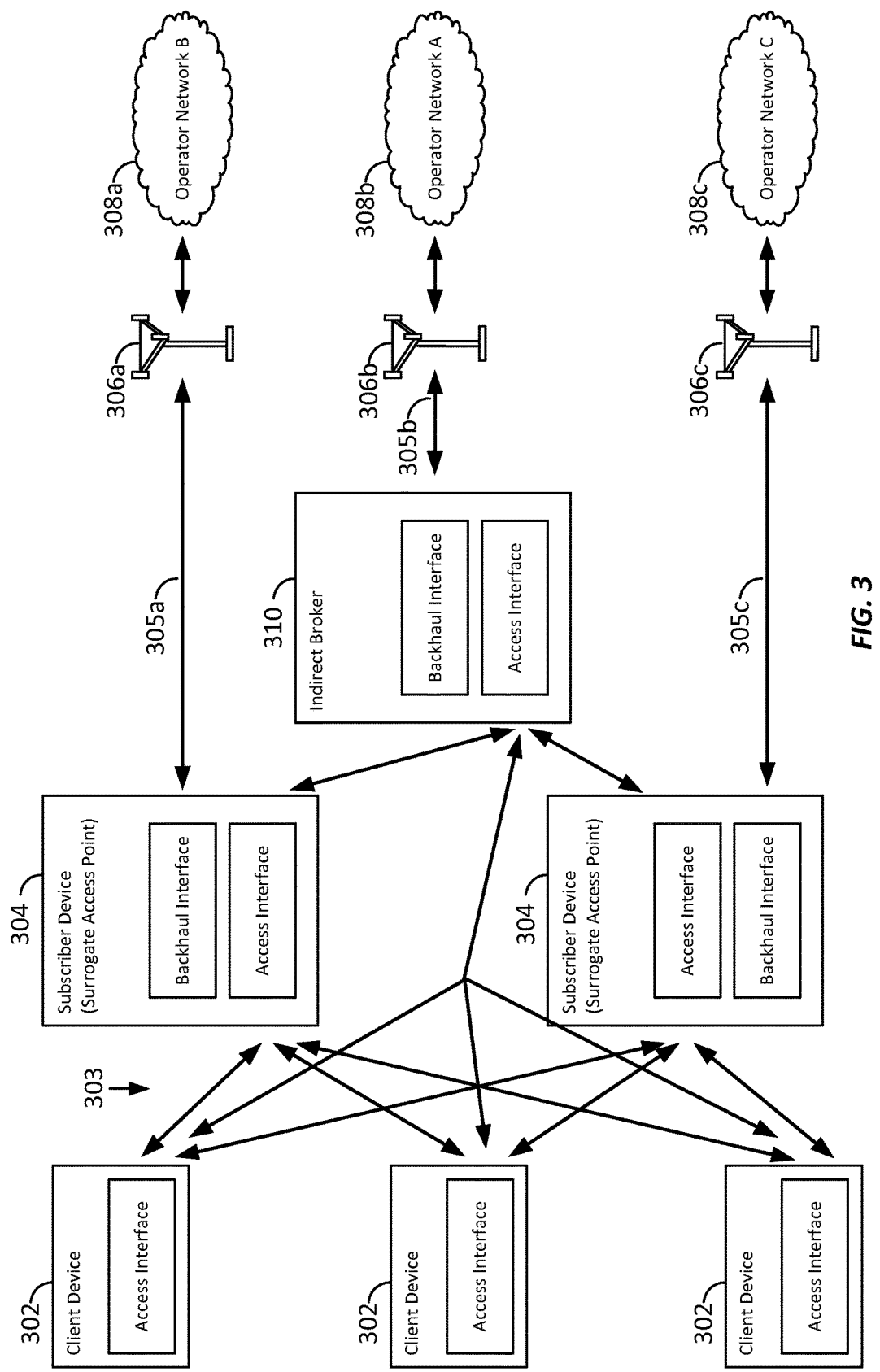
FIG. 3 is a block diagram illustrating an example of an indirect broker extending network coverage to a plurality of operator networks according to some embodiments.

FIG. 3 is a block diagram illustrating a communication network utilizing an indirect broker 310. Here, an indirect broker 310 is a broker that may or may not have any backhaul link of its own with an operator network 308. In the illustrated network, the indirect broker 310 includes a backhaul interface for providing a backhaul link 305b to a base station 306b, for communication with an operator network 308b. However, in some examples, this backhaul link is optional and may not be included. The indirect broker 310 may contact one or more proximate subscriber devices 304, which may have their own respective backhaul links 305 with operator networks 308, and may accordingly negotiate for them to share their respective backhaul links 305 with client devices 302 that are proximate to the respective subscriber devices 304.

Subscriber devices 304 may, in some examples, express to an indirect broker 310 their willingness to act as a surrogate access point utilizing a WiFi or other suitable access interface. These subscriber devices 304 may provide an identifier, their location, or any other suitable information about themselves to the indirect broker 310. The indirect broker 310 and the subscriber device 304 may exchange information about the access link 303, such as channel conditions of the access link 303, so that capacity and quality of the access link 303 may be determined Subscriber devices 304 may provide to the indirect broker 310 price information for access to their backhaul links 305, as well as spectrum information used on their backhaul link 305.

Accordingly, the broker (either direct or indirect) may negotiate with client devices over an access link between the broker and the client device, to determine whether an agreement may be reached to initiate access to an operator network. In another example applicable to the indirect broker 310, the indirect broker 310 may negotiate with the client device 302 through the potential surrogate access point 304, with the potential surrogate access point 304 acting to facilitate communication between the client device 302 and the broker 310. In the case of the direct broker 204, once an agreement is reached between the client device 202 and the broker 204, the broker 204 may act as a surrogate access point between the client device 202 and the operator network 208. In the case of the indirect broker 310, once an agreement is reached between the client device 302 and the broker 310, the broker 310 hands the client device 302 over to the selected subscriber device 304 to act as a surrogate access point.

In examples utilizing an indirect broker 310 as illustrated in FIG. 3, surrogate access points 304 can be considered to work for the broker 310. In such an arrangement, there can be an established protocol and pre-arranged set of objectives the surrogate access points 304 have agreed to honor. The broker 310 can make separate deals on access with operator networks 308 and convey this information to the surrogate access points 304 to extend to client devices 302 in the areas they are deployed. These prices could be static, prearranged, dynamic, or some combination thereof. If dynamic, real time communication takes place between the broker 310 and the associated surrogate access points. In this case, the broker 310 assumes the role of the operator network 108 in the example described above and illustrated in FIG. 1, and all three options can be retained.

In still another example, rather than dealing with a surrogate access point, the client device may deal with a remote broker (e.g., in the cloud), which may negotiate prices with one or more operator networks. In this example, once a price is agreed, the client device may communicate with the operator network utilizing any suitable access mechanism, e.g., a direct connection to the operator network utilizing a backhaul link (e.g., conventional cellular communication), etc.

In various aspects of the disclosure, the negotiation and determination of pricing and terms for a client device to access an operator network by way of a broker (either indirect or direct) may utilize any suitable price negotiation model or model.

For example, one operator network may offer a low price for a given type of service that is sought by a fraction of client devices, and another operator network may offer a low price for a high QoS for a certain type of service. Depending on the broker or surrogate access point capabilities, the operator network may be able to offer both simultaneously, or may be forced to offer one type of access at one point in time and another type of access at another point in time.

In the case where the client device, the surrogate access point, and the operator network all have aligned incentives, the bidding process may exhibit improved efficiency. For example, the client device may wish to avoid wasting valuable resources (e.g., energy) in the negotiation of pricing with a surrogate access point, and thus may wish to avoid the negotiation process entirely. Similarly, if the surrogate access point is acting as an intermediary between the client device and the operator, the amount of bandwidth allocated to the negotiation process represents lost revenue if there are other end devices willing to pay the advertised price of access.

From the operator network's perspective, price negotiation has an opportunity cost associated with it, since the negotiation process is presumably not generating revenue. These alignments likely render the auction process for auctioning off backhaul link resources to a single round bid where the surrogate access point does one of the following:

1. Announces connection parameters to client devices, including the price, and accepts the first bid matching this (or within a prescribed margin of matching);

2. Collects bids from client devices and selects the best (set of) match(es); or 3. Collects bids from client devices and conveys a subset of the collected bids to the operator for selection.

In the case where the surrogate access point is acting independently of the operator network (i.e., setting its own prices to offset its own access price), then the third option above is no longer applicable, whereas the first two options could still work.

One example of a pricing mechanism that may be utilized in some aspects of the present disclosure is described in Jeffrey K. Mackie-Mason & Hal R. Varian, *Pricing the Internet*, PUBLIC ACCESS TO THE INTERNET 269 (1993), available at http://people.ischool.berkeley.edu/~hal/Papers/UM/Pricing_the_Internet.pdf, incorporated herein by reference in its entirety. In particular, sections 6-7 of this paper describe a "smart market" model, wherein a per-packet pricing is dynamically determined, so that the price for communication reflects the current degree of network congestion. Basically, each packet may have an associated 'bid' field (e.g., in the packet's header), indicating how much the bidding device is willing to pay to send the packet. The network admits packets that have bid prices that exceed a given threshold, where the threshold to use at any given time is determined based on congestion or capacity at that time.

One key attribute of this smart market pricing model is that there is not necessary to be back-and-forth negotiation signaling associated with the bidding process. Client devices submit a bid price, which may represent the maximum they are willing to pay for access. Pricing signals transmitted by a surrogate access point would provide an indication of network congestion and demand, and bidders can submit bids at this price, above it or below it depending on intrinsic value to them. They may be guaranteed the price they pay will be less than or equal to their bid price. In this way, pricing of access follows demand, where price increases will be observed during periods of high demand. Observed latency may be impacted by bid prices, where packets with higher bid prices may receive priority over packets with lower bid prices.

Of course, the price negotiation models described above are merely exemplary in nature, and within the scope of the present disclosure, any suitable negotiation model or algorithm may be utilized to determine a price for voice/data service for a client device with an operator network.

In order for client devices, surrogate access points, brokers, and even macrocell base stations to find out that one another are within each other's vicinity and that a negotiation process may begin, suitable discovery procedures between respective devices may be utilized. As described below, in various aspects of the disclosure, a discovery procedure may be network-initiated, or client device-initiated.

That is, a client device may efficiently discover a proximate subscriber device acting as a surrogate access point in several ways, including the use of existing communication protocols such as LTE-Direct/ProSe/D2D (long-term evolution-direct, proximity-based service, device-to-device), WiFi probes, WiFi-Aware, or WiFi-NAN (network area neighborhood) discovery, and BT-LE (bluetooth low energy). The surrogate access point may, in some examples, announce/publish/advertise these services by broadcasting such discovery messages or packets over the air, to be detected by client devices in their proximity. Once a suitable client device is found, client devices may exchange signaling with surrogate access points to negotiate connectivity for specific services and IP flows.

For example, in network-initiated discovery, the operator network, or a surrogate access point acting on behalf of the operator network may transmit information about access options to client devices in a location where access may be available. The transmission of the discovery information may be made by way of broadcast messages from a macrocell base station, by way of a direct transmission utilizing the access interface from a surrogate access point or a broker device, or from any other suitable device, to client devices. Moreover, the discovery transmission may be made indirectly from the operator network, e.g., through the surrogate access point's backhaul to the network, and to the other devices. In this case, location information corresponding to the surrogate access point may be included in the discovery information. The content of the discovery information may include pertinent information about the access being offered, such as its price, quality of service (QoS), etc. The client device may collect information about any available access options, and accordingly select which one it wishes to purchase.

In client device-initiated discovery, the client device seeking access to an operator network may broadcast a suitable message to solicit a connection. Here, any surrogate access points in the client device's vicinity may be configured to monitor a corresponding channel (e.g., a discovery channel) for such solicitation messages. When the surrogate access point detects such a solicitation message, the surrogate access point may respond with information describing one or more access options, such as price, bandwidth, QoS, etc. Of course, such monitoring and response need not come from a surrogate access point or broker device, but may additionally or alternatively come from any suitable macrocell base station or other node capable of negotiating with the client device to initiate such access.

Figure 4:
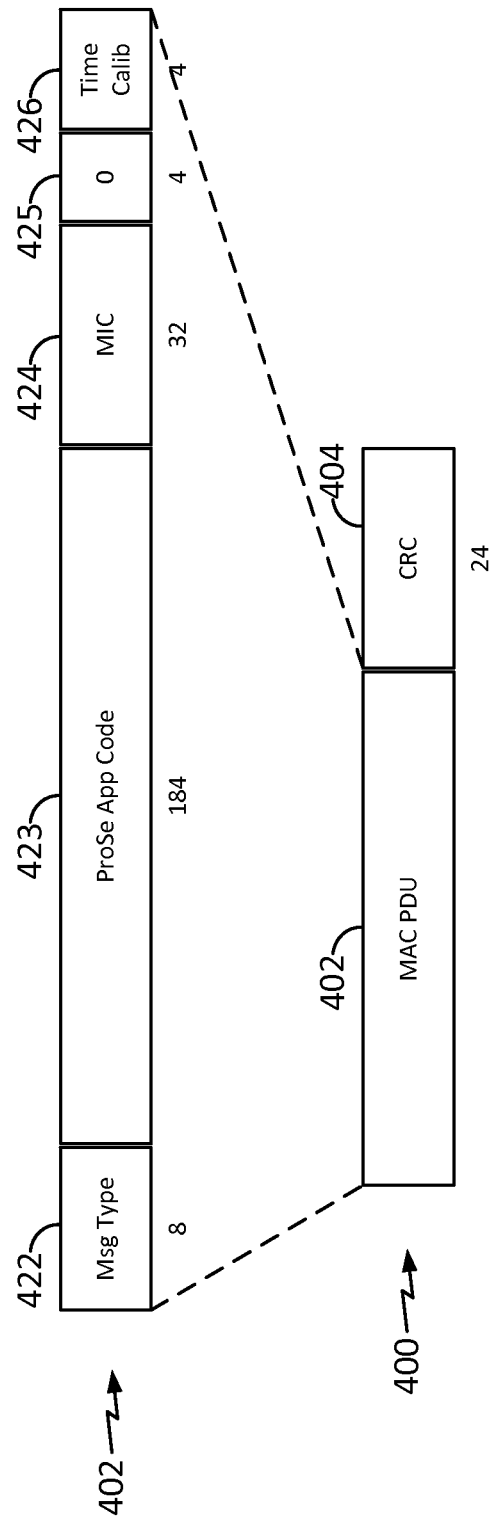
FIG. 4 is a schematic diagram illustrating a discovery frame format according to some embodiments.
Figure 5:
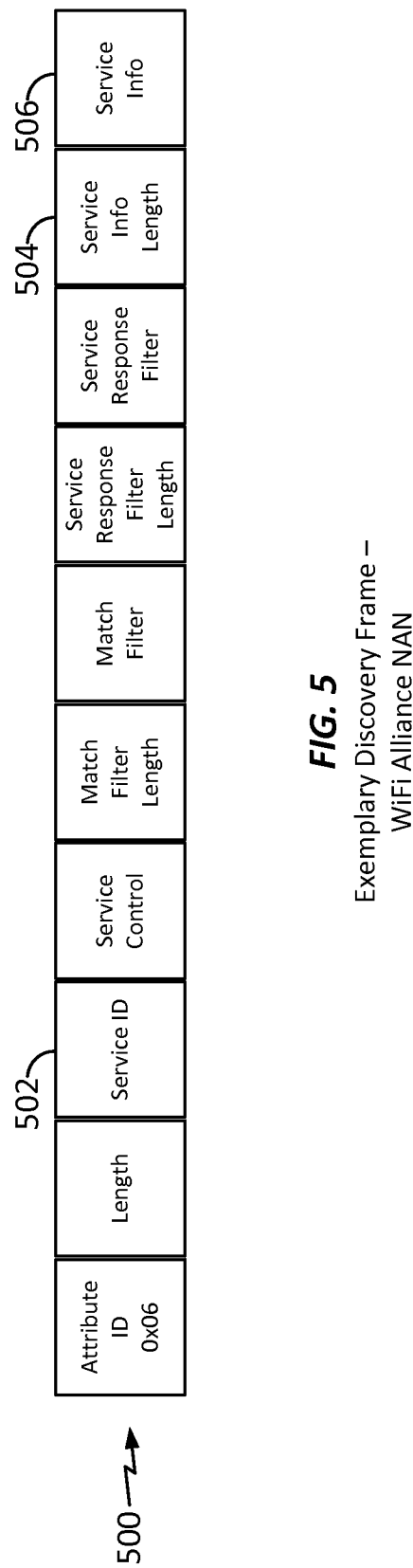
FIG. 5 is a schematic diagram illustrating a discovery frame format according to some embodiments.
Figure 6:
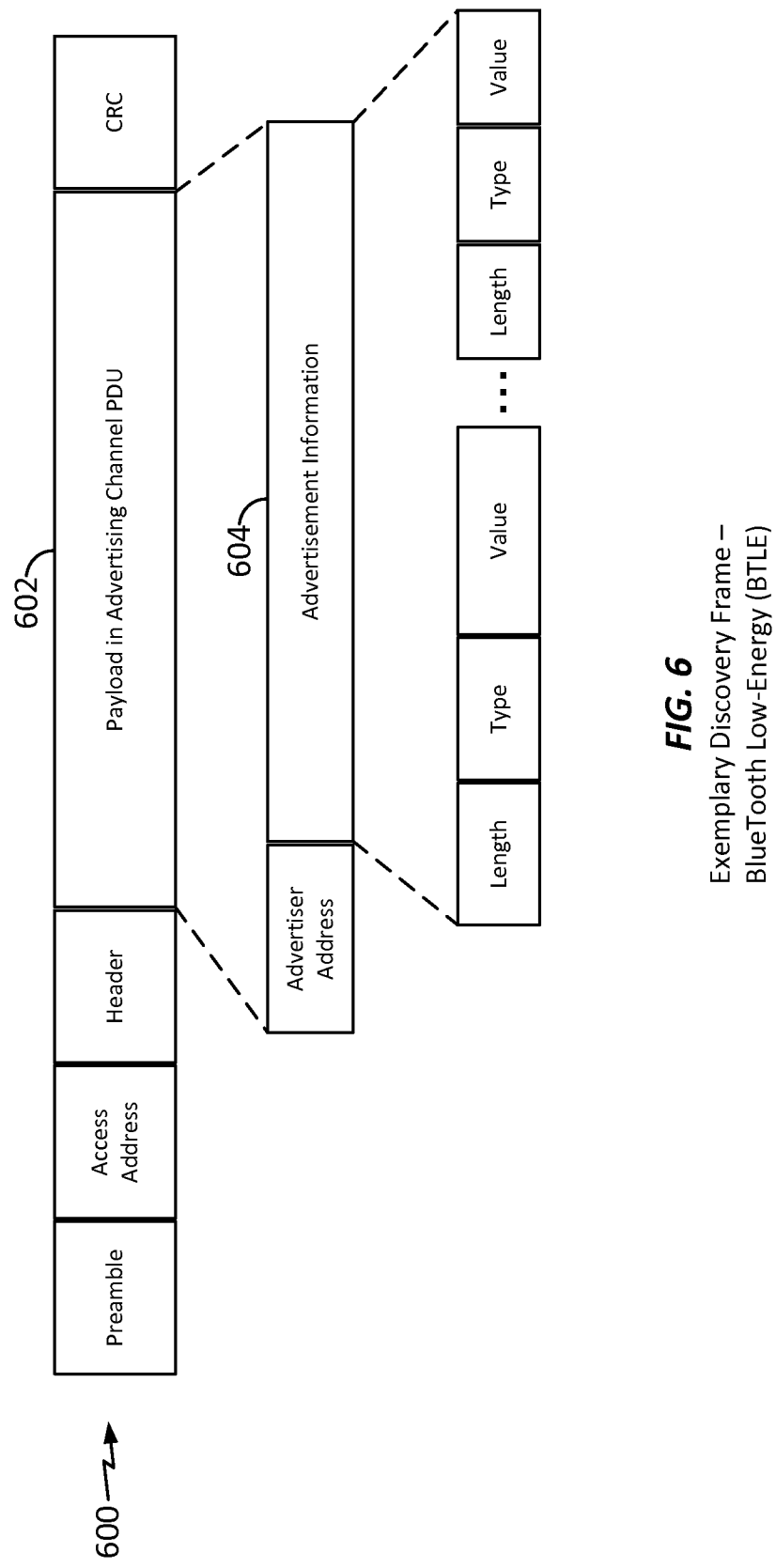
FIG. 6 is a schematic diagram illustrating a discovery frame format according to some embodiments.

The discovery packets or frames utilized in either network-initiated or client device-initiated discovery may take any suitable format within the scope of the present disclosure. For example, FIGS. 4-6 illustrate some suitable formats for discovery frames as they may be utilized in some examples. Other frame formats can also be utilized according to implementation details, within the scope of the present disclosure. Such other formats may in some examples include various portions or fields that include control and/or data bits/bit combinations to enable implementation of yield management technology as discussed in this document.

Turning now to FIG. 4, this figure illustrates a discovery frame format as it may be utilized when communication between the surrogate access point and the client device follows 3GPP LTE ProSe/D2D protocols. As illustrated, the discovery frame 400 includes a MAC layer protocol data unit (PDU) 402 and a 24-bit cyclic redundancy check (CRC) 404. The illustration explodes the MAC PDU 402 to show some of its constituent parts. Here, the MAC PDU 402 includes an 8-bit message type field 422, a 184-bit ProSe application code field 423, a 32-bit message integrity check (MIC) field 424, a 4-bit reserved field 425, which may be set to zero, and a 4-bit time calibration field 426. The message type field 422 may be utilized to signal that the MAC PDU 400 carries operator connectivity service announcements. Here, for discovery purposes in a yield management context according to various aspects of the present disclosure, the MAC PDU 402 may utilize a suitable format to include information such as the type of connectivity or technology, the bandwidth, duration, location, or price range for access.

FIG. 5 illustrates a discovery frame format as it may be utilized when communication between the surrogate access point and the client device follows WiFi Alliance NAN protocols. As illustrated, the discovery frame 500 includes a variety of different fields, each including information that may be utilized for service discovery in accordance with some aspects of the disclosure. For example, a service ID field 502 may include a hash of a reverse domain name. That is, this field may carry information identifying an advertised service as an operator-provided connectivity service. Furthermore, a service information length field 504 and a service information field 506 may include information passed directly to the application. That is, these fields may carry more specific information about the type of connectivity available in an offered service.

FIG. 6 illustrates a discovery frame format as it may be utilized when communication between the surrogate access point and the client device follows a BlueTooth low-energy (BTLE) protocol. As illustrated, the discovery frame 600 includes a variety of different fields, including a payload field 602. The illustration explodes the payload field 602 to show some of its constituent parts, including an advertisement information field 604. In some aspects of the disclosure, the advertisement information field 604 may include information passed directly from the advertising application. For example, the advertisement information field 604 may include specific information about the operator-provided connectivity, and an advertiser address subfield within this field 604 may include discovery type information.

The exemplary discovery frames in FIGS. 4-6 are merely provided to illustrate some examples of discovery frames as they may appear in an implementation within the scope of the present disclosure. However, those of ordinary skill in the art will recognize that these are merely some examples, and any suitable discovery frame may be utilized in a particular implementation. As exemplified in the respective FIGS. 4-6, the various fields may represent information such as a the type of connectivity offered by the network, the technology utilized, the bandwidth desired or available, the duration of connection desired or available, the location the service will take place, and/or the price offered by either party.

Figure 7:
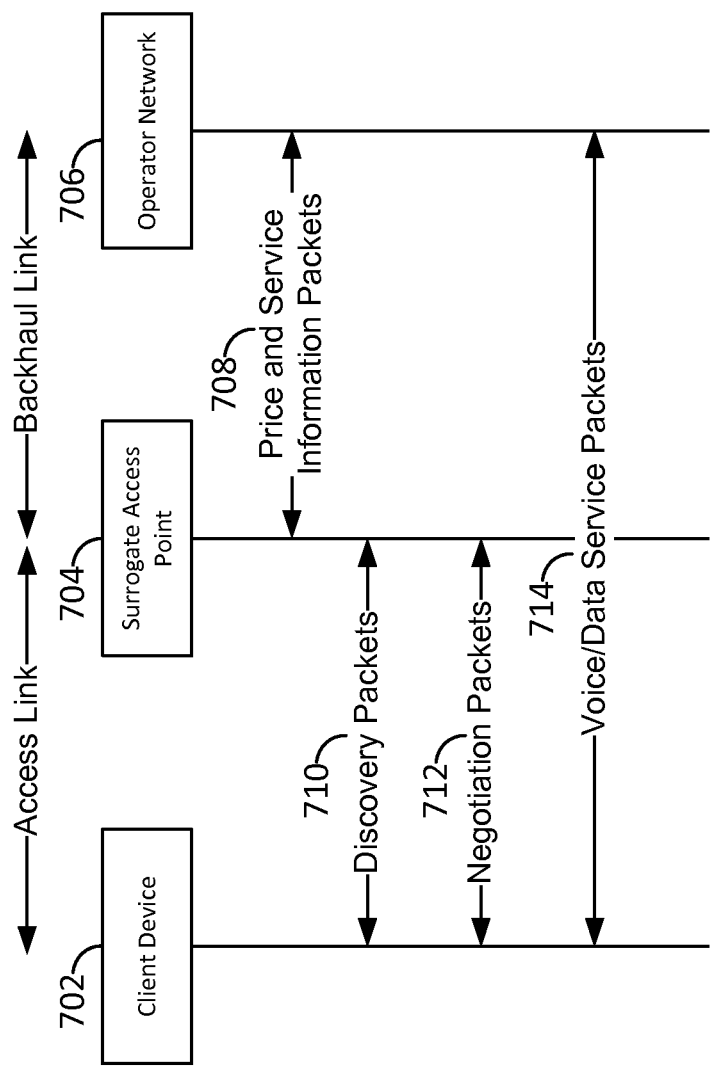
FIG. 7 is a call flow diagram illustrating a yield management procedure as it may be implemented according to some embodiments.

FIG. 7 is a call flow diagram illustrating one simple example of a yield management model as it may be implemented according to some aspects of the present disclosure. In the illustrated example, a subscriber device 704 that is a candidate to act as a surrogate access point may negotiate or exchange price and service information packets 708 with an operator network 706 utilizing a suitable communication interface (e.g., a backhaul or WWAN interface). When a client device 702 approaches the vicinity of the subscriber device 704, their relative proximity is determined, and in some examples, initial price, service, and/or offer information, is exchanged by way of discovery packets 710. Optionally, following the discovery packets 710, further negotiation packets 712 may be exchanged between the client device 702 and the subscriber device 704, to obtain a final agreement between the nodes for communication services. Finally, when the agreement is reached and all security and authentication protocols are handled, voice and/or data service packets 714 may be exchanged between the client device 702 and the operator network 706, e.g., utilizing the subscriber device 704 acting as a surrogate access point, as described above.

In some examples, packets exchanged between respective nodes in the discovery and/or negotiation processes described above may include information about link quality. Here, the determination of the link quality may be made by any suitable node. For example, a network node at the operator network (e.g., a macrocell base station) may include information about the backhaul (e.g., WWAN) link between the network node and a candidate surrogate access point in its messages to the surrogate access point, and in some examples, information about its own link to the operator network, which may be a wired link, a microwave link, a fiber link, or otherwise, and may include several different components for information signaling from the network node to the rest of the operator network. Further, the surrogate access point may include information about the backhaul (e.g., WWAN) link and/or the access link between the client device and the surrogate access point in its messages to the client device. Similarly, the client device may include information about the access link between the client device and the surrogate access point in its communication with other network entities.

Further, the respective network nodes may include information about links not directly available to them, if such information is communicated to those entities during negotiation or other communication with other entities to which such information is available. Still further, information relating to the relationship between different links, such as what fraction of the backhaul would be allocated to that particular client device, may be communicated between entities. In this way, a client device, which might typically expect that its access link would be the bottleneck in any communication session, may be enabled to determine whether upstream congestion might affect its QoS. For the surrogate access point, when it communicates a given QoS to a client device during a discovery message or during negotiation, the surrogate access point may accordingly be constrained from soliciting additional client devices, in that it may wish to insure that serving them does not degrade the service of the client or clients that are being served. That is, the surrogate access point may reserve backhaul link capacity for client devices, and if the same wireless resource is used to serve multiple client devices on the access link, it may account for any degradation to those clients being served having to share the access link 103 with the new clients being added.

After agreeing to the price and terms of the connection, a client device may establish connectivity with the operator network, exchanging voice and/or data packets as agreed during a negotiation procedure. In a scenario where a client device connects directly to the operator network by way of a macrocell base station or other similar access node, then the client device may utilize any suitable WWAN communication medium known to those of ordinary skill in the art. In a scenario wherein a surrogate access point is utilized, as illustrated for example in FIG. 1, the client device 102 may communicate with the surrogate access point 104 utilizing a suitable access link 103, and the surrogate access point 104 may relay that communication to the operator network 108 utilizing a suitable backhaul link 105. The access link 103 may be any suitable wired or wireless communication link between the surrogate access point 104 and the client device 102, used for sharing access to the backhaul link 105 to the operator network 108. When wireless, the access link 103 may operate in one or more licensed or unlicensed bands, and may, in various examples, utilize any suitable protocol including but not limited to Bluetooth, WiFi, ZigBee, mmWave, WWAN, LTE-U/DU, etc. The backhaul link 105 may be any suitable wired or wireless communication link between the surrogate access point 104 and a network node 106 such as a macrocell base station within the operator network 108. When wireless, the backhaul link 105 may operate in one or more licensed or unlicensed bands, and may be a direct connection between the surrogate access point 104 and an end node (e.g., a macrocell base station), or may be a multi-hop connection (e.g., through one or more intermediary relays, surrogate access points, etc.). Attributes of the backhaul link 105, such as its cost, latency, bandwidth, etc., may be generally known to the surrogate access point 104. Some examples of a backhaul link 105 may include a WWAN interface or a wired Internet connection.

In some examples, the surrogate access point may simply relay information between a client device and an operator network. In other examples, the surrogate access point may operate between a plurality of client devices and/or a plurality of operator networks. In this case, the surrogate access point may function to combine many users' links or flows into a single backhaul link to an operator network. In this way, when compared to a scenario where each of the client devices operated according to their own WWAN interface, the total overhead can be substantially reduced. That is, rather than each of the devices competing for resources for acknowledgment messages, page messages, or other overhead message resources, all of these users' overhead messages may be communicated over the single backhaul link to the surrogate access point. Accordingly, overall capacity of the operator network can be increased.

During an ongoing call that utilizes a surrogate access point, issues of mobility can arise, relating to mobility of the client device and/or mobility of the surrogate access point. For example, when a client device is connected to a surrogate access point, and the client device moves away from the proximity of the surrogate access point (e.g., moving out of range of the access link), the connection between the client device and the surrogate access point may terminate. At the time of the termination, or before the time of termination in the case where this situation is known and reported to the operator network, the operator network may attempt to locate another suitable access point for the client device. If another suitable access point (e.g., a surrogate access point) is located, a handoff from one surrogate access point to another surrogate access point may take place so that the negotiated service may continue to be fulfilled. In some examples, the surrogate access points before and after the handover may be associated with the same operator network, or may be associated with different operator networks. Here, the handoff between surrogate access points may utilize a break-before-make transition, or any other suitable transition between surrogate access points. If such a handoff is not possible or not available, the connection may be terminated, and in some cases, a refund may be issued to the client device for unfulfilled services.

On the other hand, during an ongoing call, the surrogate access point may be mobile, and may move away from a client device that is utilizing the surrogate access point to connect to the operator network. In the case that the surrogate access point moves out of range of the client device, the connection between the client device and the surrogate access point may be terminated.

If another suitable access point (e.g., a surrogate access point) is located, a handoff of the client device from the mobile surrogate access point to a more suitable access point may take place so that the negotiated service for the client device may continue to be fulfilled. If such a handoff is not possible, the connection may be terminated, and in some cases, a refund may be issued to the client device for unfulfilled services.

In still another scenario, during an ongoing call, the surrogate access point may undertake a handover from one macrocell base station to another macrocell base station utilizing its backhaul link. Here, the access link between the surrogate access point and the client device may be maintained.

In any mobility scenario, the financial parameters negotiated by the client device may be retained when the client device hands over from one surrogate access point to another, from a surrogate access point to a macrocell base station, or undertakes any other mobility procedure. This may essentially be a session transfer of the communication session. The client device may assist in the handoff or session transfer by providing the operator and/or the broker with a list of discovered SAP's who are affiliated with the "operator/broker" such that the financial arrangement for the session is maintained. This is similar to providing the eNB a neighbor list that is used to facilitate handoff from one cell to another in mobile cellular systems.

According to various aspects of the disclosure, suitable measures may be taken to ensure the security of the various involved users, their devices, and the information communicated. Those having ordinary skill in the art will recognize that a wide variety of encryption, hardware, and software techniques may be utilized to ensure security of the client device, security of the subscriber device, and operator network security. Furthermore, each entity in the network may implement a suitable authentication model to ensure others in the network are secure.

In further detail, the assets to be protected in a yield management system may include the operator network's resources (connectivity/spectrum) and the surrogate access point's resources (battery, offered bandwidth, etc.). In addition, it is important to protect the privacy of a client device's data from the surrogate access point. That is, the surrogate access point generally should not get access to the traffic of the client device. Methods to achieve such protection depend on technical feasibility but how effective—and therefore how costly—such methods are depends also on the likelihood of attacks against aforementioned assets.

In this yield management model, there are three logical entities: the operator network, the client device, and the surrogate access point. Of these, it may be recognized by those skilled in the art that only the operator network can be a 'trusted party' in the implementation of security measures, since the operator network generally has no motivation to mount attacks against client devices or surrogate access points. However, both the client device and the surrogate access point may have an incentive to mount attacks. For example, the client device may obtain service without paying, or after paying less than agreed, e.g., by claiming it never consumed the services (or consumed less). The client device may also attempt to use more resources than paid for. Further, the surrogate access point may attempt to intercept and possibly redirect the client device's traffic without authorization. Further, the surrogate access point may attempt to obtain credit for services that it never provided.

Even though the operator network may be a trusted party, the operator network may not be able to vouch for the services offered by surrogate access points at a given moment. At most, only that surrogate access point may be allowed to act as a surrogate. In such cases, to protect the client device from misrepresented offers from a surrogate access point, and to protect the surrogate access point from the client device denying that it ever received services, non-repudiation methods may be employed. Since the operator network is the endpoint of the client device's traffic, then as long as the operator network can correlate the subscriber of the client device with the Internet protocol (IP) packets that are sourced by it and transmitted via the surrogate access point, then the operator can keep an accurate log of what traffic has been exchanged. Therefore, the client device may not be able to deny receiving these services. However, the operator network may not be able to verify that the QoS of the surrogate access point-to-client device link was what the surrogate access point claimed it was. In the end, even if the offers were misrepresented by the surrogate access point when it first communicated with the client device, in the end it is the operator's records of data that both surrogate access point and client device can believe and thus settle the payment arrangements.

To support the privacy requirement, the surrogate access point should not act as a gateway/agent that terminates the application-layer protocols (e.g. SIP) of the client device. Instead, the surrogate access point may behave as a Layer 3 router, just forwarding packets between the client device and operator network. Then the traffic between the client device and the operator network can employ its own security that does not expose the unencrypted packets to the surrogate access point. For example, IPsec established between the client device and the operator network's PDN gateway or evolved packet data gateway may suffice.

In addition, for the negotiation of services before the client device actually sends/receives IP packets to/from the operator network, a secure point-to-point link may be established between the surrogate access point and the client device. Authentication of these two may not be as essential as the verification that the surrogate access point is authorized, in cases where it acts on behalf of the operator network or with its approval, and the support of the non-repudiation methods whereby neither the surrogate access point nor the client device can later on deny that they offered or respectively consumed the services in question.

Exemplary methods to set up a secure link may be generally recognized in the art to be either shared-key based on certificate-based. For certificate-based secure link establishment, an example suitable for a yield management system is that subscriber certificates may be issued and provisioned by the operator network to at least all devices authorized to act as surrogate access points. A secret key mah then be derived via any suitable certificate-based procedure such as Diffie-Hellman, known to those of ordinary skill in the art. Here, the certificate-based procedure may not require operator network involvement at the time of the establishment. For a shared-key based secure link establishment, the surrogate access point may allow signaling traffic to flow between the client device and the operator network without counting it as a service, and not requiring any verification, in order for the operator network to provide a shared, secret but temporary session key for this link to the customer device without exposing it to eavesdroppers on the surrogate access point-to-client device link. After both the surrogate access point and client device are securely provisioned with such a session key, then protected traffic can flow between the two.

The surrogate access point may not in general be thought of as a trusted element, the same way a LTE proximity-based services (ProSe) user equipment-to-network relay would. That is, the surrogate access point should not act as a back-to-back user agent or application-level gateway (B2BUA/ALG), because that would mean that it terminates SIP/other traffic from the client device, so it would have visibility into that traffic.

Rather, the surrogate access point may act as a simple L3 router. In this way, the traffic between the client device and the operator network would have its own security (e.g., IPsec connectivity between the user equipment and the evolved packet data gateway (ePDG) concatenated with S2b bearer(s) between the ePDG and the PGW").

In some examples, the surrogate access point may act as an untrusted non-3GPP access node. (e.g., see 3GPP TS 23.402). The surrogate access point may then send and receive IP packets to/from network on behalf of the client device.

A secure tunnel may be established between the client device a network node (e.g., a PDN gateway), established e.g. by reusing UE-to-NW relay design in ProSe/D2D 3GPP work item (e.g., see 3GPP TS23.303, TS33.303).

A secure point-to-point link may be established between the surrogate access point and the client device. Here, each client device may be provisioned with an operator-signed subscription certificate. In another example, before services are started, the surrogate access point may allow a signaling transaction via itself between the customer and the operator network, to receive a temporary session key for this p2p link.

At the upper layers (e.g., the application layer), the client device and the subscriber device acting as a surrogate access point may have suitable user interfaces or application programs for managing subscriptions and agreements for access to wireless communication networks. For example, at the client device, a connection manager application may be provided to manage the client device subscriptions and access network selection. The connection manager application may store the user's cost management objectives, such as their budget, their QoS requirements, their latency requirements, etc. Further, the connection manager may collect information about access options and their costs, e.g., in accordance with various discovery messages received by the client device. In some examples, the connection manager may further automatically select suitable networks or select surrogate access points as needed to obtain service. Further, in some examples, the connection manager may present to the user a ranked list of connection options based on one or more factors such as price, bandwidth, QoS, etc., so that the user may select one connection option for purchase.

The subscriber device may include a connection manager similar to one on the client device, with the ability to make connectivity decisions based on cost and other metrics such as signal strength, throughput, policies etc. This connection manager may further used for the subscriber device's own applications. The subscriber device may also include a connection manager for the surrogate access point. This connection manager manages connections and IP flows on behalf of client devices. It understands the cost of relaying packets, considering operator relationships, battery status, etc. Prices agreed with client devices or services may be decided by the surrogate access point or by the operator as previously discussed. Surrogate access points may receive credits from operator(s) to provide access to client devices. Service credentials may be leveraged by client devices to obtain access via a surrogate access point.

Figure 8:
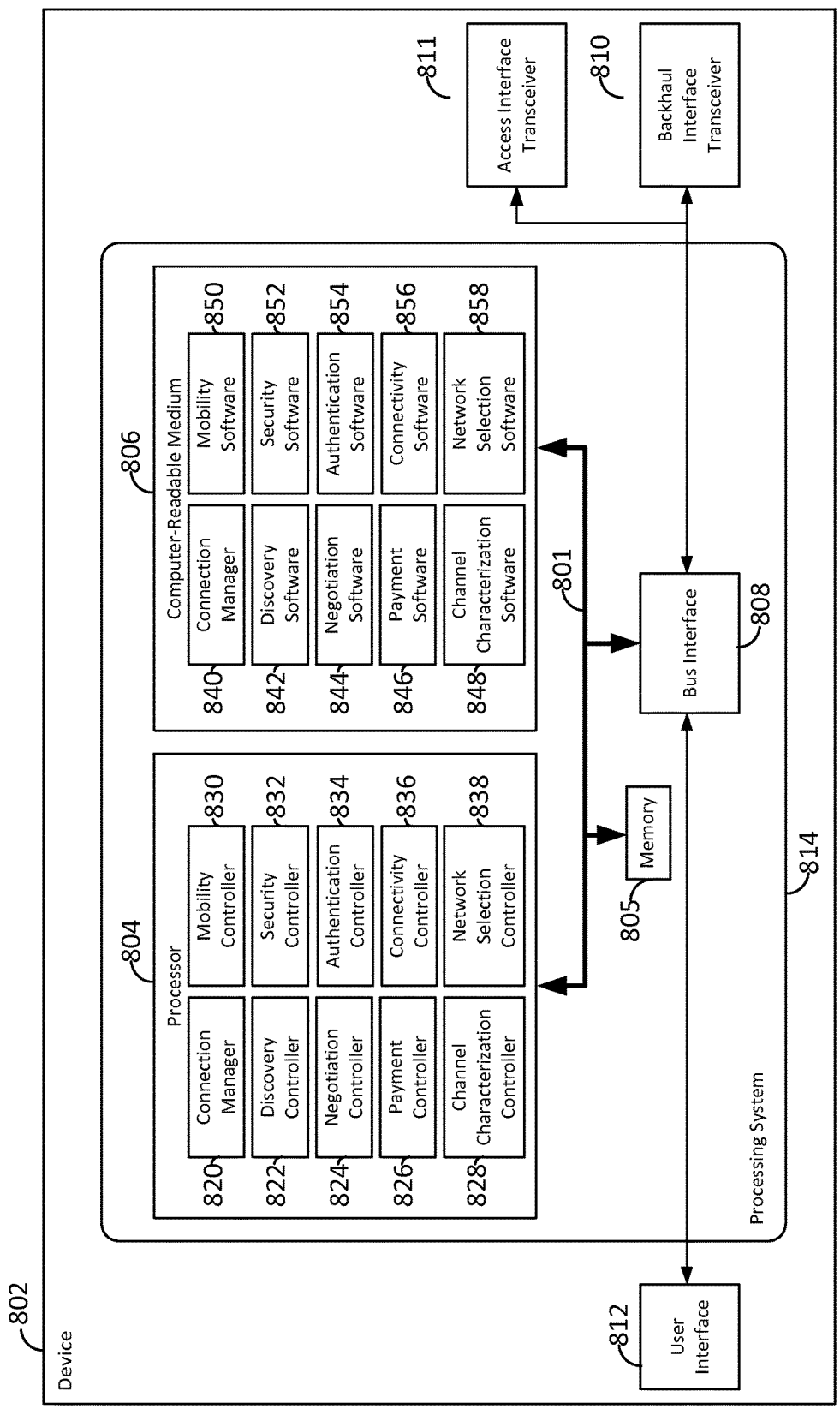
FIG. 8 is a block diagram illustrating an example of a wireless communication device according to some embodiments.

FIG. 8 is a conceptual diagram illustrating an example of a hardware implementation for a device 802 employing a processing system 814. In accordance with various aspects of the disclosure, an element, or any portion of an element, or any combination of elements may be implemented with a processing system 814 that includes one or more processors 804. For example, the device 802 may be a client device 102, 202, 302, and/or 702 as illustrated in any one or more of FIGS. 1, 2, 3, and/or 7. In another example, the device 802 may be a subscriber device 104, 204, 304, and/or 704 as illustrated in any one or more of FIGS. 1, 2, 3, and/or 7. In still another example, the device 802 may be an indirect broker device 310 as illustrated in FIG. 3. In even further examples, the device 802 may be any suitable radio transceiver apparatus, and in some examples, may be embodied by a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. Within the present document, a base station may be referred to as a scheduling entity, indicating that the base station provides scheduling information to one or more subordinate entities.

In other examples, the device 102 may be embodied by a wireless user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a UE may be referred to either as a scheduling entity, or a subordinate entity. That is, in various aspects of the present disclosure, a wireless UE may operate as a scheduling entity providing scheduling information to one or more subordinate entities, or may operate as a subordinate entity in accordance with scheduling information provided by a scheduling entity.

Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 804, as utilized in a device 102, may be used to implement any one or more of the processes described herein and illustrated in FIGS. 7, 9, 10, and/or 11.

In this example, the processing system 814 may be implemented with a bus architecture, represented generally by the bus 801. The bus 801 may include any number of interconnecting buses and bridges depending on the specific application of the processing system 814 and the overall design constraints. The bus 801 links together various circuits including one or more processors (represented generally by the processor 804), a memory 805, and computer-readable media (represented generally by the computer-readable medium 806). The bus 801 may also link various other circuits such as timing sources, peripherals, voltage regulators, and power management circuits, which are well known in the art, and therefore, will not be described any further. A bus interface 808 provides an interface between the bus 801 and one or more transceivers, such as a backhaul interface transceiver 810 and an access interface transceiver 811. The transceivers 810 and 811 provide means for communicating with various other apparatus over a transmission medium. Depending upon the nature of the apparatus, a user interface 812 (e.g., keypad, display, speaker, microphone, joystick) may also be provided.

For example, the processor 804 may include a connection manager 820. As described above, in various aspects of the disclosure a connection manager 820 may manage device subscriptions and access network selection for a yield management configuration. The processor 804 may further include a discovery controller 822 for managing discovery procedures between respective devices, e.g., utilizing a discovery frame as illustrated in one of FIGS. 4-6. The processor 804 may further include a negotiation controller 824 for managing a negotiation process for establishing terms for access under a yield management configuration. The processor 804 may further include a payment controller 826 for managing payments to/from the device 802 for client device access to an operator network under a yield management configuration. The processor 804 may further include a channel characterization controller 828 for measuring and characterizing one or more communication channels, e.g., determining a bandwidth, latency, available QoS, etc. The processor 804 may further include a mobility controller 830 for managing handovers and other mobility procedures undertaken during operator network access under a yield management configuration. The processor 804 may further include a security controller 832 and an authentication controller 834 for controlling security measures and authentication models to protect the various nodes during access utilizing a yield management configuration. The processor 804 may further include a connectivity controller 836 for establishing connectivity and exchanging voice and/or data packets as agreed during a negotiation procedure while operating under a yield management configuration. The processor 804 may further include a network selection controller 838 for selecting between two or more operator networks, as in the cases utilizing a broker to offer access via two or more operator networks, under a yield management configuration.

The processor 804 is responsible for managing the bus 801 and general processing, including the execution of software stored on the computer-readable medium 806. The software, when executed by the processor 804, causes the processing system 814 to perform the various functions described below for any particular apparatus. The computer-readable medium 806 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

For example, the computer-readable medium 806 may include connection manager software 840. As described above, in various aspects of the disclosure the connection manager software 840 may be an application configured to manage device subscriptions and access network selection for a yield management configuration. The computer-readable medium 806 may further include discovery software 842 for managing discovery procedures between respective devices, e.g., utilizing a discovery frame as illustrated in one of FIGS. 4-6. The computer-readable medium 806 may further include negotiation software 844 for managing a negotiation process for establishing terms for access under a yield management configuration. The computer-readable medium 806 may further include payment software 846 for managing payments to/from the device 802 for client device access to an operator network under a yield management configuration. The computer-readable medium 806 may further include channel characterization software 848 for measuring and characterizing one or more communication channels, e.g., determining a bandwidth, latency, available QoS, etc. The computer-readable medium 806 may further include mobility software 850 for managing handovers and other mobility procedures undertaken during operator network access under a yield management configuration. The computer-readable medium 806 may further include security software 852 and authentication software 854 for controlling security measures and authentication models to protect the various nodes during access utilizing a yield management configuration. The computer-readable medium 806 may further include connectivity software 856 for establishing connectivity and exchanging voice and/or data packets as agreed during a negotiation procedure while operating under a yield management configuration. The computer-readable medium 806 may further include network selection software 858 for selecting between two or more operator networks, as in the cases utilizing a broker to offer access via two or more operator networks, under a yield management configuration.

Figure 9:
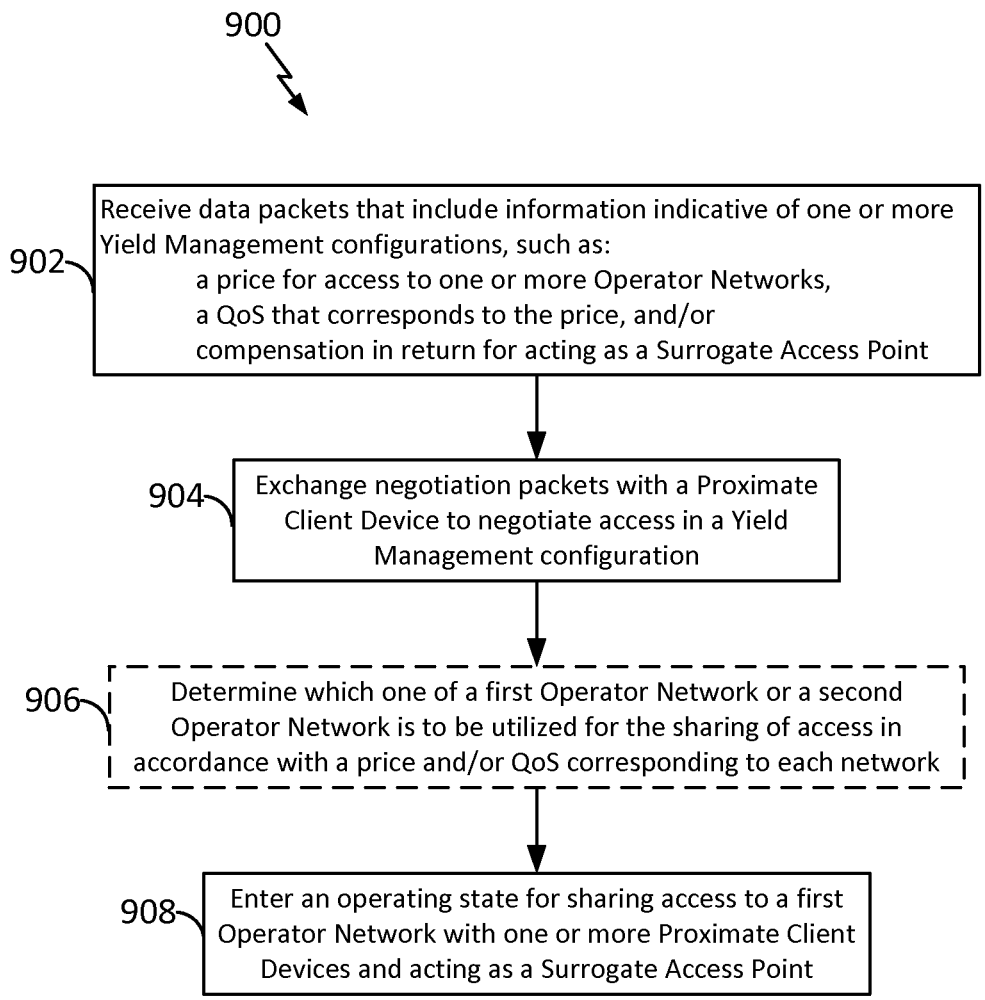
FIG. 9 is a flow chart illustrating an example of a process for network access utilizing yield management according to some embodiments.

FIG. 9 is a flow chart illustrating an exemplary process 900 for wireless communication in accordance with some aspects of the present disclosure. In some examples, the process 900 may be implemented by a subscriber device capable of acting as a surrogate access point, such as the surrogate access point 104, 204, 304, or 704 illustrated in FIGS. 1, 2, 3, and/or 7, and described above. In further examples, the process 900 may be implemented by a device 802 as illustrated in FIG. 8 and described above. In other examples, the process 900 may be implemented by any suitable apparatus or means for carrying out the described functions.

At block 902, the device 802 may receive one or more wireless communication signals over either an access link or a backhaul link. These signals may include one or more data packets having information indicative of one or more yield management configurations. Here, as described above, a yield management configuration may be any suitable configuration of a device such as the device 802, wherein a price to provide access to communication resources offered by an operator network is negotiated in accordance with a set of suitable parameters. Thus, the received data packets may include information about such parameters, including but not limited to a price for access to one or more operator networks; a quality of service (QoS) that corresponds to the price; and/or an amount and/or kind of compensation that may be provided to the device 802 in return for its acting as a surrogate access point.

At block 904, the device 802 may exchange negotiation packets with a proximate client device, in order to negotiate access for the client device in a yield management configuration. As described above, these packets may be generated by the device 802, which may in some examples negotiate with the client device on its own; while in other examples these packets may be passed by the device 802 to an operator network, which may accordingly communicate its own negotiation packets for the client device. At optional block 906, in some examples such as those utilizing a broker (described above, for example, in relation to FIGS. 2 and 3), the device 802 may determine which one of a first operator network or a second operator network is to be utilized for the sharing of access in accordance with the parameters received in block 902. For example, if a first operator network offers a better combination of QoS and price than a second operator network, the device 802 may select the first operator network.

At block 908, the device 802 may enter an operating state for sharing access to the first operator network over a backhaul link with one or more proximate client devices. That is, the device 802 may communicate with those one or more proximate client devices over an access link, acting as a surrogate access point for the first operator network.

Figure 10:
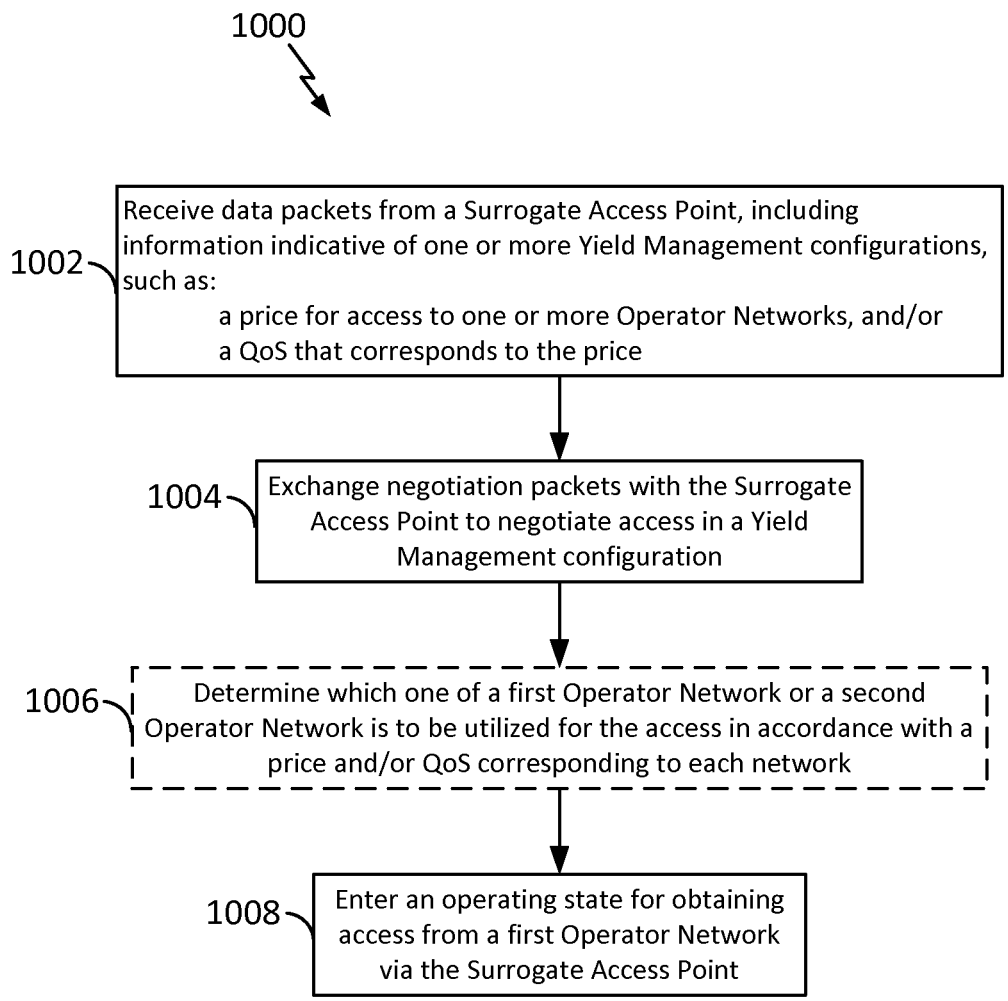
FIG. 10 is a flow chart illustrating another example of a process for network access utilizing yield management according to some embodiments.

FIG. 10 is a flow chart illustrating an exemplary process 1000 for wireless communication in accordance with further aspects of the present disclosure. In some examples, the process 1000 may be implemented by a client device capable of obtaining operator network access via a surrogate access point, such as the client device 102, 202, 302, and/or 702 illustrated in FIGS. 1, 2, 3, and/or 7, and described above. In further examples, the process 1000 may be implemented by a device 802 as illustrated in FIG. 8 and described above. In other examples, the process 1000 may be implemented by any suitable apparatus or means for carrying out the described functions.

At block 1002, the device 802 may receive one or more wireless communication signals from a surrogate access point over an access link. These signals may include one or more data packets having information indicative of one or more yield management configurations. Here, as described above, a yield management configuration may be any suitable configuration of a device such as the device 802, wherein a price to obtain access to communication resources offered by an operator network is negotiated in accordance with a set of suitable parameters. Thus, the received data packets may include information about such parameters, including but not limited to a price for access to one or more operator networks, and/or a QoS that corresponds to the price.

At block 1004, the device 802 may exchange negotiation packets with a proximate subscriber device (e.g., one configured to act as a surrogate access point), in order to negotiate access to an operator network in a yield management configuration. As described above, these packets may be exchanged with the subscriber device/surrogate access point itself, or in other examples, may be passed by the subscriber device/surrogate access point to an operator network, which may accordingly communicate its own negotiation packets for the device 802. At optional block 1006, in some examples such as those utilizing a broker (described above, for example, in relation to FIGS. 2 and 3), the device 802 may determine which one of a first operator network or a second operator network is to be utilized from which to obtain access in accordance with the parameters received in block 1002. For example, if a first operator network offers a better combination of QoS and price than a second operator network, the device 802 may select the first operator network.

At block 1008, the device 802 may enter an operating state such that the device 802 is configured to obtain access from the first operator network by communicating with the surrogate access point utilizing the access link. That is, the surrogate access point may act as an access point for the device 802 to obtain access to the first operator network.

Figure 11:
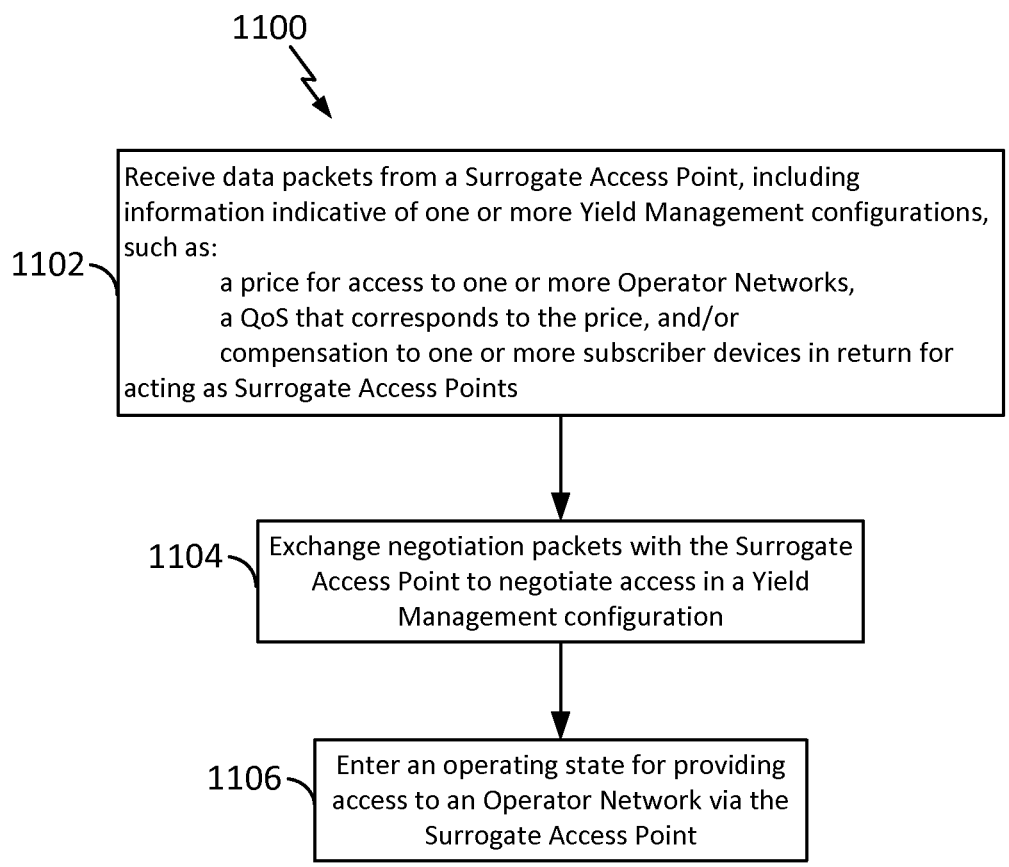
FIG. 11 is a flow chart illustrating another example of a process for network access utilizing yield management according to some embodiments.

FIG. 11 is a flow chart illustrating an exemplary process 1100 for wireless communication in accordance with further aspects of the present disclosure. In some examples, the process 1100 may be implemented by a network node in an operator network capable of providing access to wireless resources via a surrogate access point, such as the base station 106, 206, and/or 306 illustrated in FIGS. 1, 2, and/or 3, and described above. In further examples, the process 1100 may be implemented by an other suitable node or cloud-based entity in an operator network such as the operator networks 108, 208, 308, and/or 706 illustrated in FIGS. 1, 2, 3, and/or 7, and described above. In still further examples, the process 1100 may be implemented by a device 802 as illustrated in FIG. 8 and described above. In other examples, the process 1100 may be implemented by any suitable apparatus or means for carrying out the described functions.

At block 1102, the device 802 may receive one or more wireless communication signals from one or more surrogate access points over a backhaul link. These signals may include one or more data packets having information indicative of one or more yield management configurations. Here, as described above, a yield management configuration may be any suitable configuration of a device such as the device 802, wherein a price for providing communication resources is negotiated in accordance with a set of suitable parameters. Thus, the received data packets may include information about such parameters, including but not limited to a price to offer for access to the operator network to one or more wireless communication devices, a QoS that corresponds to the price, and/or information indicative of compensation to the one or more subscriber devices in return for the subscriber devices acting as surrogate access points for the operator network.

At block 1104, the device 802 may exchange negotiation packets with the one or more subscriber devices (e.g., ones configured to act as surrogate access points), in order to negotiate access to the operator network in a yield management configuration. As described above, these packets may be exchanged with the client device itself, utilizing the subscriber device/surrogate access point as a kind or relay or proxy to facilitate communication between the device 802 and the client device.

At block 1106, the device 802 may enter an operating state such that the device 802 is configured to provide access to an operator network to one or more wireless communication devices, by communicating with the one or more subscriber devices/surrogate access points over the backhaul link. That is, the one or more surrogate access points may act as access points for the operator network.

As those skilled in the art will readily appreciate, various aspects described throughout this disclosure may be extended to any suitable telecommunication systems, network architectures and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (WiFi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 9-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A wireless communication device, comprising:
   an access interface transceiver configured for communication with one or more proximate devices;
   a backhaul interface transceiver configured for communication with a first network; and
   a processor configured to:
      receive one or more wireless communication signals utilizing the access interface transceiver or the backhaul interface transceiver, the communication signals comprising one or more data packets that include information indicative of one or more yield management configurations for dynamically relating at least one of a price to offer for access to the first network, or a supply of resources for access to the first network, to one or more parameters based on demand for access to the first network; and
      determine, based on the information indicative of one or more yield management configurations contained within the one or more signaled data packets, to place the wireless communication device in an operating state where it is configured to share access to the first network over the backhaul interface with the one or more proximate devices by communicating with those one or more proximate devices over the access interface and acting as a surrogate access point to the first network.

2. The wireless communication device of claim 1, wherein the one or more data packets of the communication signals comprise:
   information indicative of the price to offer to the one or more proximate devices to access the first network; and
   information indicative of a quality of service (QoS) that corresponds to the offered price.

3. The wireless communication device of claim 1, wherein the one or more data packets of the communication signals comprise information indicative of compensation to offer to the wireless communication device in return for acting as the surrogate access point to the network.

4. The wireless communication device of claim 1, wherein the backhaul interface transceiver is further configured for communication with a second network; and wherein the processor is further configured to negotiate with the one or more proximate devices to determine which of the first network or the second network to be utilized in accordance with a price and/or a quality of service (QoS) corresponding to each of the first network and the second network.

5. A wireless communication device, comprising:
an access interface transceiver configured for communication with a surrogate access point; and
a processor configured to:
receive one or more wireless communication signals utilizing the access interface transceiver, the communication signals comprising one or more data packets that include information indicative of one or more yield management configurations for dynamically relating at least one of a price to offer for access to a first network, or a supply of resources for access to the first network, to one or more parameters based on demand for access to the first network; and
determine, based on the information indicative of one or more yield management configurations contained within the one or more signaled data packets, to place the wireless communication device in an operating state where it is configured to access the first network by communicating with the surrogate access point utilizing the access interface transceiver, the surrogate access point acting as an access point for the first network.

6. The wireless communication device of claim 5, wherein the one or more data packets of the communication signals comprise:
information indicative of a first price to offer to the wireless communication device to access the first network; and
information indicative of a first quality of service (QoS) that corresponds to the first price.

7. The wireless communication device of claim 6, wherein the one or more data packets of the communication signals further comprise:
information indicative of a second price to offer to the wireless communication device to access a second network; and
information indicative of a second QoS that corresponds to the second price.

8. The wireless communication device of claim 7, wherein the processor is further configured to select between the first network and the second network based on the first and second price and the first and second QoS.

9. A network node comprising:
a backhaul interface transceiver configured for communication with one or more surrogate access points; and
a processor configured to:
transmit or receive one or more wireless communication signals utilizing the backhaul interface transceiver, the communication signals comprising one or more data packets that include information indicative of one or more yield management configurations for dynamically relating at least one of a price to offer for access to a network, or a supply of resources for access to the network, to one or more parameters based on demand for access to the network; and
determine, based on the one or more yield management configurations contained within the one or more signaled data packets, to place the network node in an operating state where it is configured to provide access to the network to one or more wireless communication devices, by communicating with the one or more surrogate access points, the one or more surrogate access points acting as access points for the network.

10. The network node of claim 9, wherein the one or more data packets of the communication signals comprise:
information indicative of the price to offer to the wireless communication device to access the network;
information indicative of a quality of service (QoS) that corresponds to the price; and
information indicative of compensation to offer to the one or more surrogate access points in return for the one or more surrogate access points acting as access points for the network.

11. The network node of claim 9, wherein the one or more data packets of the communication signals comprise information indicative of compensation to offer to the one or more surrogate access points in return for the one or more surrogate access points acting as the access points for the network.

12. A method of wireless communication operable at a wireless communication device, comprising:
receiving one or more wireless communication signals over an access link or a backhaul link, the communication signals comprising one or more data packets that include information indicative of one or more yield management configurations for dynamically relating at least one of a price to offer for access to a first network, or a supply of resources for access to the first network, to one or more parameters based on demand for access to the first network; and
determining, based on the one or more yield management configurations contained within the one or more signaled data packets, to enter an operating state for sharing access to a first network over the backhaul link with one or more proximate devices by communicating with those one or more proximate devices over the access link and acting as a surrogate access point to the first network.

13. The method of claim 12, wherein the one or more data packets of the communication signals comprise:
information indicative of a price to offer to the one or more proximate devices to access the first network; and
information indicative of a quality of service (QoS) that corresponds to the offered price.

14. The method of claim 12, wherein the one or more data packets of the communication signals comprise information indicative of compensation to offer to the wireless communication device in return for acting as the surrogate access point to the network.

15. The method of claim 12, further comprising:
negotiating with the or more proximate devices to determine which of the first network or a second network to be utilized for the sharing of access in accordance with a price and/or a quality of service (QoS) corresponding to each of the first network and the second network.

16. A method of wireless communication operable at a wireless communication device, comprising:
receiving one or more wireless communication signals from a surrogate access point over an access link, the communication signals comprising one or more data packets that include information indicative of one or more yield management configurations for dynamically relating at least one of a price to offer for access to a first network, or a supply of resources for access to the first network, to one or more parameters based on demand for access to the first network; and determining, based on the one or more yield management configurations contained within the one or more signaled data packets, to enter an operating state where the wireless communication device is configured to access the first network by communicating with the surrogate access point utilizing the access link, the surrogate access point acting as an access point for the first network.

17. The method of claim 16, wherein the one or more data packets of the communication signals comprise:
  information indicative of a first price to offer to the wireless communication device to access the first network; and
  information indicative of a first quality of service (QoS) that corresponds to the first price.

18. The method of claim 17, wherein the one or more data packets of the communication signals further comprise:
  information indicative of a second price to offer to the wireless communication device to access a second network; and
  information indicative of a second QoS that corresponds to the second price.

19. The method of claim 18, further comprising:
  selecting between the first network and the second network based on the first and second price and the first and second QoS.

20. A method of wireless communication, comprising:
  transmitting or receiving one or more wireless communication signals to or from one or more surrogate access points over a backhaul link, the communication signals comprising one or more data packets that include information indicative of one or more yield management configurations for dynamically relating at least one of a price to offer for access to a network, or a supply of resources for access to the network, to one or more parameters based on demand for access to the network; and
  determining, based on the one or more yield management configurations contained within the one or more signaled data packets, to enter an operating state for providing access to the network to one or more wireless communication devices, by communicating with the one or more surrogate access points over the backhaul link, the one or more surrogate access points acting as access points for the network.

21. The method of claim 20, wherein the one or more data packets of the communication signals comprise:
  information indicative of the price to offer to the wireless communication device to access the network;
  information indicative of a quality of service (QoS) that corresponds to the price; and
  information indicative of compensation to offer to the one or more surrogate access points in return for the one or more surrogate access points acting as access points for the network.

22. The method of claim 20, wherein the one or more data packets of the communication signals comprise information indicative of compensation to offer to the one or more surrogate access points in return for the one or more surrogate access points acting as the access points for the network.

23. A non-transitory computer-readable medium storing computer executable code, comprising:
  instructions for causing a wireless communication device to receive one or more wireless communication signals over an access link or a backhaul link, the communication signals comprising one or more data packets that include information indicative of one or more yield management configurations for dynamically relating at least one of a price to offer for access to a first network, or a supply of resources for access to the first network, to one or more parameters based on demand for access to the first network; and
  instructions for causing the wireless communication device to determine, based on the one or more yield management configurations contained within the one or more signaled data packets, to enter an operating state for sharing access to a first network over the backhaul link with one or more proximate devices by communicating with those one or more proximate devices over the access link and acting as a surrogate access point to the first network.

24. The non-transitory computer-readable medium of claim 23, wherein the one or more data packets of the communication signals comprise:
  information indicative of a price to offer to the one or more proximate devices to access the first network; and
  information indicative of a quality of service (QoS) that corresponds to the offered price.

25. The non-transitory computer-readable medium of claim 23, wherein the one or more data packets of the communication signals comprise information indicative of compensation to offer to the wireless communication device in return for acting as the surrogate access point to the network.

26. The non-transitory computer-readable medium of claim 23, further comprising:
  instructions for causing the wireless communication device to negotiate with the or more proximate devices to determine which of the first network or a second network to be utilized for the sharing of access in accordance with a price and/or a quality of service (QoS) corresponding to each of the first network and the second network.

27. A non-transitory computer-readable medium storing computer executable code, comprising:
  instructions for causing a wireless communication device to receive one or more wireless communication signals from a surrogate access point over an access link, the communication signals comprising one or more data packets that include information indicative of one or more yield management configurations for dynamically relating at least one of a price to offer for access to a first network, or a supply of resources for access to the first network, to one or more parameters based on demand for access to the first network; and
  instructions for causing the wireless communication device to determine, based on the one or more yield management configurations contained within the one or more signaled data packets, to enter an operating state where the wireless communication device is configured to access the first network by communicating with the surrogate access point utilizing the access link, the surrogate access point acting as an access point for the first network.

28. The non-transitory computer-readable medium of claim 27, wherein the one or more data packets of the communication signals comprise:
  information indicative of a first price to offer to the wireless communication device to access the first network; and
  information indicative of a first quality of service (QoS) that corresponds to the first price.

29. The non-transitory computer-readable medium of claim 28, wherein the one or more data packets of the communication signals further comprise:
information indicative of a second price to offer to the wireless communication device to access a second network; and
information indicative of a second QoS that corresponds to the second price.

30. The non-transitory computer-readable medium of claim 29, further comprising:
instructions for causing the wireless communication device to select between the first network and the second network based on the first and second price and the first and second QoS.

31. A non-transitory computer-readable medium storing computer executable code, comprising:
instructions for causing a wireless communication device to transmit or receive one or more wireless communication signals to or from one or more surrogate access points over a backhaul link, the communication signals comprising one or more data packets that include information indicative of one or more yield management configurations for dynamically relating at least one of a price to offer for access to a network, or a supply of resources for access to the network, to one or more parameters based on demand for access to the network; and
instructions for causing the wireless communication device to determine, based on the one or more yield management configurations contained within the one or more signaled data packets, to enter an operating state for providing access to the network to one or more wireless communication devices, by communicating with the one or more surrogate access points over the backhaul link, the one or more surrogate access points acting as access points for the network.

32. The non-transitory computer-readable medium of claim 31, wherein the one or more data packets of the communication signals comprise:
information indicative of the price to offer to the wireless communication device to access the network;
information indicative of a quality of service (QoS) that corresponds to the price; and
information indicative of compensation to offer to the one or more surrogate access points in return for the one or more surrogate access points acting as access points for the network.

33. The non-transitory computer-readable medium of claim 31, wherein the one or more data packets of the communication signals comprise information indicative of compensation to offer to the one or more surrogate access points in return for the one or more surrogate access points acting as the access points for the network.

34. The wireless communication device of claim 1, wherein the wireless communication device is a subscriber device having a service subscription for communication with the first network via the backhaul interface;
wherein sharing access to the first network over the backhaul interface comprises utilizing resources corresponding to the service subscription; and
wherein the processor is further configured to communicate with the first network via the backhaul interface without acting as the surrogate access point, utilizing resources corresponding to the service subscription.

35. The wireless communication device of claim 34, wherein the processor is further configured to meter usage of the resources corresponding to the service subscription by the one or more proximate devices when the wireless communication device acts as the surrogate access point.

36. The wireless communication device of claim 5, wherein the one or more data packets that include information indicative of one or more yield management configurations comprise information indicative of at least two yield management configurations corresponding to at least two surrogate access points, including the surrogate access point; and
wherein the processor, being configured to determine to place the wireless communication device in the operating state where it is configured to access the first network, is further configured to select the surrogate access point over a second surrogate access point of the at least two surrogate access points in accordance with the at least two yield management configurations.

37. The wireless communication device of claim 5, wherein, prior to the receiving the one or more wireless communication signals comprising one or more data packets that include information indicative of one or more yield management configurations, the wireless communication device is not a subscriber device having a service subscription for communication with the first network via the access interface.

38. The network node of claim 9, wherein the processor is further configured to: determine the price to offer to the one or more wireless communication devices based on an availability of resources on the network via the backhaul interface.

39. The network node of claim 38, wherein the processor, being configured to determine the price to offer, is further configured to:
set the price to offer to a first price when the availability of resources is below a low threshold; and
set the price to offer to a second price, lower than the first price, when the availability of resources is above a high threshold.

40. The network node of claim 38, wherein the one or more wireless communication devices are not subscribers to the access network.

41. The network node of claim 10, wherein the processor, being configured to determine to place the network node in the operating state where it is configured to provide access to the network to one or more wireless communication devices, is further configured to determine to place the network node in the operating state based on a determination that an availability of resources on the network via the backhaul interface is greater than an availability threshold.

42. The network node of claim 41, wherein the compensation to offer to the one or more surrogate access points is based on the availability of resources on the network via the backhaul interface.

* * * * *